US006985259B2

(12) United States Patent
Okinaka et al.

(10) Patent No.: US 6,985,259 B2
(45) Date of Patent: Jan. 10, 2006

(54) THRESHOLD MATRIX, AND METHOD AND APPARATUS OF REPRODUCING GRAY LEVELS USING THRESHOLD MATRIX

(75) Inventors: Keiji Okinaka, Ichikawa (JP); Takashi Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 865 days.

(21) Appl. No.: 09/826,934

(22) Filed: Apr. 6, 2001

(65) Prior Publication Data
US 2001/0038465 A1 Nov. 8, 2001

(30) Foreign Application Priority Data
Apr. 13, 2000 (JP) .............................. 2000-112143

(51) Int. Cl.
*G06K 15/00* (2006.01)

(52) U.S. Cl. ....................... 358/3.1; 358/3.12; 358/3.13

(58) Field of Classification Search ............... 358/2.99, 358/3.01, 3.02, 3.03, 3.1, 3.12, 3.13, 448, 358/471, 2.1; 382/167, 169
See application file for complete search history.

(56) References Cited

U.S. PATENT DOCUMENTS

| 5,111,310 | A | | 5/1992 | Parker et al. ................ 358/456 |
| 5,521,987 | A | * | 5/1996 | Masaki ........................ 382/218 |
| 6,633,412 | B1 | * | 10/2003 | Lin et al. .................... 358/3.13 |
| 6,671,422 | B1 | * | 12/2003 | Nakanishi .................... 382/291 |
| 2002/0071140 | A1 | | 6/2002 | Suzuki et al. ............... 358/3.01 |

FOREIGN PATENT DOCUMENTS

| EP | 963105 | 8/1999 |
| JP | 2622429 | 4/1997 |
| JP | 2000-59626 | 2/2000 |

OTHER PUBLICATIONS

B.E. Bayer, "An Optimum Method For Two-Level Rendition Of Continuous-Tone Pictures", Proceedings IEEE Int. Conf. Comm., Conference Record, pp. 26-11 to 26-15, 1973.
R.A. Ulichney, "Dithering with Blue Noise", Proceedings of the IEEE, vol. 76, No. 1, pp. 56-79, Jan. 1988.
T. Misa, et al., "Digital halftoning technique using a blue-noise mask", Journal Optical Society Of America, A/vol. 9, No. 11, pp. 1920-1929, Nov. 1992.

\* cited by examiner

*Primary Examiner*—Jerome Grant, II
(74) *Attorney, Agent, or Firm*—Fitzpatrick, Cella, Harper & Scinto

(57) ABSTRACT

When one-to-one correspondence is made between each pixel of an original image and each element of a threshold matrix, a density of each pixel in an output image is represented by binary or multivalue, and a dot pattern of which the size corresponds to the threshold matrix is divided into small blocks, the threshold matrix is created such that the number of dots in each of all the blocks is made equal in all gray levels, the dot patterns in the plural blocks are made mutually the same in all the gray levels, and at a boundary of the blocks where the dot patterns are made mutually the same, the dots are increased while taking conformity of the dot patterns, or the threshold matrix is created such that order of dot increase is controlled between the blocks where the dot patterns are made mutually the same and the other blocks. Thus, the threshold matrix by which uniformity of the dot pattern is increased and a problem of texture is improved, a gray level reproduction method which uses this threshold matrix, and a gray level reproduction apparatus which uses this threshold matrix are provided.

25 Claims, 20 Drawing Sheets

THRESHOLD MATRIX, AND METHOD AND APPARATUS OF REPRODUCING GRAY LEVELS USING THRESHOLD MATRIX

BACKGROUND OF THE INVENTION

1. Field of the Invention

The present invention relates to a threshold matrix and gray level reproducing method and apparatus using the threshold matrix, and more specifically to a threshold matrix and gray level reproducing method and apparatus using the threshold matrix for converting input image data into binary or multivalue data in a gray level reproducing process.

2. Related Background Art

One of most used methods among conventionally known gray level reproducing methods is an error diffusion method.

In the error diffusion method, an input image is converted into a binary image or a multivalue image by comparing each pixel of this input image with a threshold, and at this time, an error (a quantizing error) between input and output values is weighted and diffused to predetermined adjacent pixels to preserve an image density. The image which was output by this method has excellent image quality and resolution, however, processing speed is low because the process itself is complicated. Further, in a dot pattern which is created by the error diffusion method, generally, a position to be dotted is different according to an input image, whereby it is difficult to predict a degree of mixture of colors. Thus, there is a drawback that color reproducibility is poor as compared with a later-described systematic dithering method.

Incidentally, an independent determination-type dithering method is known as the gray level reproducing method by which the process is simplified and thus processing speed is high. In the independent determination-type dithering method, a pixel value of an input image is compared with a threshold in one-to-one to determine an output value. In this method, since only a noticed (or remarked) pixel is independently processed, and its peripheral pixels are not processed, whereby processing speed is high.

The independent determination-type dithering method is further classified into two methods, i.e., a random dithering method and a systematic dithering method, in accordance with a difference of how to represent the threshold.

The random dithering method is the method by which the threshold is changed for each pixel at random. The dot pattern which was obtained by this method has a white noise characteristic, whereby there is an advantage that any moire does not occur. However, in this dot pattern, image quality is low because a graininess is insistent or outstand, whereby the random dithering method is hardly being used now.

On the other hand, the systematic dithering method is the method which uses a threshold matrix (also called a dither matrix, a mask or the like) that thresholds are arranged. The systematic dithering method is broadly classified into clustered-dot dithering and dispersed-dot dithering according to how to arrange the thresholds in the threshold matrix.

In the clustered-dot dithering, the dots thickly increase at the position corresponding to the center of the threshold matrix, as the number of gray levels increases. Since the dot pattern created in this method has a low spatial frequency, its image quality is low in a case where an output device of which the definition is relatively low is used. Thus, the clustered-dot dithering is used in a field of, e.g., printing of which the definition is high.

On the other hand, in the dispersed-dot dithering, the threshold matrix is designed such that a dot arrangement of an output pattern is spatially dispersed. As a representative of the dispersed-dot dithering, a Bayer-type systematic dithering method ("An Optimum Method For Two-Level Rendition Of Continuous-Tone Pictures" Bayer, Proc. IEEE Int. Conf. Commun., Conference Record, p.26–11, 1973) is known so far. In the Bayer-type systematic dithering method, since a threshold arrangement is extremely regular, when an input image having a uniform gray level is subjected to a halftone process, an output pattern which is extremely regular for the input images of all gray levels is created, whereby uniformity of the dot pattern is satisfactory. However, when an output device of which the definition is relatively low is used, there is a problem that a rough texture (dither pattern) is perceived at a period of the size (16×16 in case of 256 gray levels) of a threshold matrix. Further, when a periodic pattern is included in the input image, there is a problem that moire may occur in the output image. For this reason, in the output device of which the definition is relatively low, i.e., several hundreds of dots per inch (dpi), image quality is deteriorated as compared with the error diffusion method, whereby the Bayer-type systematic dithering method is not used for the purpose to obtain a high-quality halftone image.

On the other hand, in recent years, it came to be known to obtain excellent image quality in a case where a dot pattern of an output image is a blue noise pattern ("Dithering With Blue Noise" R. L. Ulichney, Proc. IEEE, vol. 76, No. 1, p. 56). The blue noise pattern is characterized with a power spectrum (a blue noise characteristic) which consists of noise components aperiodic, isotropic and having less low frequency components. Ulichney contrived a perturbed error diffusion method by introducing irregularity to the conventional error diffusion method, and thus achieved the blue noise pattern.

The method which was proposed to achieve this blue noise pattern by using the systematic dithering method is a blue noise masking method (Japanese Patent No. 2622429, U.S. Pat. No. 5,111,310, "Digital Half-toning Technique Using Blue-Noise Mask", T. Mitsa and K. J. Parker, J. OptSoc. Am, vol. 9, No. 11, pp. 1920–1929 (1992)). When the input image having the gray level of uniform mask size is processed by using the blue noise masking method, the output dot pattern has the blue noise characteristic. Therefore, like the perturbed error diffusion method of Ulichney, any moire does not occur, and thus graininess is reduced as compared with the random dithering method. Further, as compared with the perturbed error diffusion method, the operation is simple, and thus processing speed is high.

However, in the dot pattern which is created by using the blue noise masking method, uniformity of the dot distribution is deteriorated according to the number of gray levels, whereby unevenness appears in the output image. Specifically, the noise is felt in the dot patterns adjacent to the minimum gray level and the maximum gray level.

The reason of such a problem is as follows. Namely, in the blue noise masking method, the dot pattern of intermediate gray level is optimized and created, and then the dot patterns of high and low gray levels are sequentially created, whereby degree of freedom for dot selection is low nearby the minimum and maximum gray levels, and thus it is difficult to obtain the ideal dot pattern. Specifically, when the blue noise masking method is used in an ink-jet printer, nonuniformity of the dot pattern in the low gray level part where the dots are sparsely arranged and such sparsity is visible has the room for improvement.

Further, a dot pattern creation method which repetitively uses two-dimensional discrete Fourier transform and two-dimensional inverse discrete Fourier transform is complicated, whereby there is a problem that it takes time to create the dot pattern.

As the systematic dithering method by which uniformity of the dot pattern is increased, there is the method disclosed in Japanese Patent Application Laid-Open No. 2000-59626. In this method, the uniformity of the dot pattern is maintained by using regularity of the dot pattern created by the Bayer-type systematic dithering method, and at the same time irregularity is introduced to the dot pattern to reduce the problems of dither pattern and moire.

Since the threshold matrix in this method includes plural same threshold structures, this matrix creates anisotropic and periodic dot patterns in all of the gray levels and has a characteristic opposite to the blue noise characteristic. Further, by eliminating redundancy of the information of the parts having the same threshold structure, a memory capacity to store the threshold matrices can be reduced.

On the other hand, in recent years, according as the ink-jet printer is widespread, demands of general users for image quality is highly developed. However, in the above method, though not so insistent, a texture (dither pattern) occasionally appears slightly in the longitudinal, lateral or diagonal direction along which the plural same structures are arranged, in accordance with the gray level, and thus this method has the room for improvement.

SUMMARY OF THE INVENTION

An object of the present invention is to provide a threshold matrix for solving the above drawback in the related background art, increasing uniformity of a dot pattern, and thus improving a problem of texture, a gray level reproduction method which uses this threshold matrix, and a gray level reproduction apparatus which uses this threshold matrix.

Another object of the present invention is to provide a threshold matrix for improving a potential calculation method and thus remarkably improving conformity at a boundary of threshold matrices, a gray level reproduction method which uses this threshold matrix, and a gray level reproduction apparatus which uses this threshold matrix.

Still another object of the present invention is to provide a threshold matrix for making the sum of potentials the same in blocks where dot patterns are made the same and thus increasing uniformity of the dot pattern, a gray level reproduction method which uses this threshold matrix, and a gray level reproduction apparatus which uses this threshold matrix.

To achieve the above objects, there is provided in the present invention a gray level reproduction method which makes one-to-one correspondence between each pixel of an original image and each element of a threshold matrix, and represents a density of each pixel in an output image by binary or multivalue, wherein the threshold matrix is created according to following conditions:

(1) when a dot pattern of which the size corresponds to the threshold matrix is divided into small blocks, the number of dots in each of all the blocks is made equal in all gray levels;

(2) the dot patterns in the plural blocks are made mutually the same in all the gray levels; and (3) at a boundary of the blocks where the dot patterns are made mutually the same, the dots are increased while taking conformity of the dot patterns.

Further, there is provided in the present invention a gray level reproduction method which makes one-to-one correspondence between each pixel of an original image and each element of a threshold matrix, and represents a density of each pixel in an output image by binary or multivalue, wherein the threshold matrix is created according to following conditions:

(1) when a dot pattern of which the size corresponds to the threshold matrix is divided into small blocks, the number of dots in each of all the blocks is made equal in all gray levels;

(2) the dot patterns in the plural blocks are made mutually the same in all the gray levels; and (3) order of dot increase is controlled between the blocks where the dot patterns are made mutually the same and the other blocks.

Further, there is provided in the present invention a gray level reproduction apparatus which makes one-to-one correspondence between each pixel of an original image and each element of a threshold matrix, and represents a density of each pixel in an output image by binary or multivalue, wherein, when a dot pattern of which the size corresponds to the threshold matrix is divided into small blocks, the number of dots in each of all the blocks is made equal in all gray levels, and the dot patterns in the plural blocks are made mutually the same in all the gray levels, the apparatus comprising:

a storage means for storing the threshold matrix;

a comparison means for comparing as a threshold the value of the threshold matrix with the density of each pixel of the original image for each pixel; and an output means for outputting the binary- or multivalue-processed dot pattern according to the comparison result of the comparison means, wherein, at a boundary of the blocks where the dot patterns are made mutually the same, the threshold matrix is created such that the dots are increased while taking conformity of the dot patterns.

Further, there is provided in the present invention a gray level reproduction apparatus which makes one-to-one correspondence between each pixel of an original image and each element of a threshold matrix, and represents a density of each pixel in an output image by binary or multivalue, wherein, when a dot pattern of which the size corresponds to the threshold matrix is divided into small blocks, the number of dots in each of all the blocks is made equal in all gray levels, and the dot patterns in the plural blocks are made mutually the same in all the gray levels, the apparatus comprising:

a storage means for storing the threshold matrix;

a comparison means for comparing as a threshold the value of the threshold matrix with the density of each pixel of the original image for each pixel; and an output means for outputting the binary- or multivalue-processed dot pattern according to the comparison result of the comparison means, wherein the threshold matrix is created by controlling order of dot increase between the blocks where the dot patterns are made mutually the same and the other blocks.

Further, there is provided in the present invention a threshold matrix which is used to be compared with each pixel of an original image to represent a density of each pixel in an output image by binary or multivalue, and created according to following conditions:

(1) when a dot pattern of which the size corresponds to the threshold matrix is divided into small blocks, the number of dots in each of all the blocks is made equal in all gray levels;

(2) the dot patterns in the plural blocks are made mutually the same in all the gray levels; and (3) at a boundary of the blocks where the dot patterns are made mutually the same, the dots are increased while taking conformity of the dot patterns.

Further, there is provided in the present invention a threshold matrix which is used to be compared with each pixel of an original image to represent a density of each pixel in an output image by binary or multivalue, and created according to following conditions:

(1) when a dot pattern of which the size corresponds to the threshold matrix is divided into small blocks, the number of dots in each of all the blocks is made equal in all gray levels;

(2) the dot patterns in the plural blocks are made mutually the same in all the gray levels-, and (3) order of dot increase between the blocks where the dot patterns are made mutually the same and the other blocks is controlled.

Further, there is provided in the present invention a storage medium which computer-readably stores a control program to control a gray level reproduction process which makes one-to-one correspondence between each pixel of an original image and each element of a threshold matrix and represents a density of each pixel in an output image by binary or multivalue, wherein, when a dot pattern of which the size corresponds to the threshold matrix is divided into small blocks, the number of dots in each of all the blocks is made equal in all gray levels, and the dot patterns in the plural blocks are made mutually the same in all the gray levels, the storage medium comprising:

the threshold matrix which is created, at a boundary of the blocks where the dot patterns are made mutually the same, such that the dots are increased while taking conformity of the dot patterns;

a module for performing control to compare as a threshold the value of the threshold matrix with the density of each pixel of the original image for each pixel, and output the binary- or multivalue-processed dot pattern according to the comparison result.

Further, there is provided in the present invention a storage medium which computer-readably stores a control program to control a gray level reproduction process which makes one-to-one correspondence between each pixel of an original image and each element of a threshold matrix and represents a density of each pixel in an output image by binary or multivalue, wherein, when a dot pattern of which the size corresponds to the threshold matrix is divided into small blocks, the number of dots in each of all the blocks is made equal in all gray levels, and the dot patterns in the plural blocks are made mutually the same in all the gray levels, the storage medium comprising:

the threshold matrix which is created by controlling order of dot increase between the blocks where the dot patterns are made mutually the same and the other blocks; and a module for performing control to compare as a threshold the value of the threshold matrix with the density of each pixel of the original image for each pixel, and output the binary- or multivalue-processed dot pattern according to the comparison result.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiments of the present invention and, together with the description, serve to explain the principles of the present invention.

DETAILED DESCRIPTION OF THE PREFERRED EMBODIMENTS

The preferred embodiments of the present invention will now be described in detail in accordance with the accompanying drawings.

The present invention can be applied to represent halftone in an apparatus such as a conventional type ink-jet printer, a bubble-jet (BJ) printer and the like for generating an image by determining, in the simplest case, whether or not a dot of ink is to be placed for each pixel of an output image. Similarly, it can be applied to halftone rendering in a liquid crystal device, etc. for displaying an image bi-level pixels, each of which is bright or dark.

More generally, the present invention can be applied to desirable halftone rendering in an apparatus such as a laser beam printer, facsimile, a printing apparatus and the like, including an ink-jet printer and the like each of which converts a monochrome or color image having continuous change of gradation (gray levels) into a binary or multivalue density output image.

It should be noted that the term "render" is synonymous with the term "represent" throughout the present application.

[Structural Example of Processing Apparatus in the Embodiments]

Figure 2:
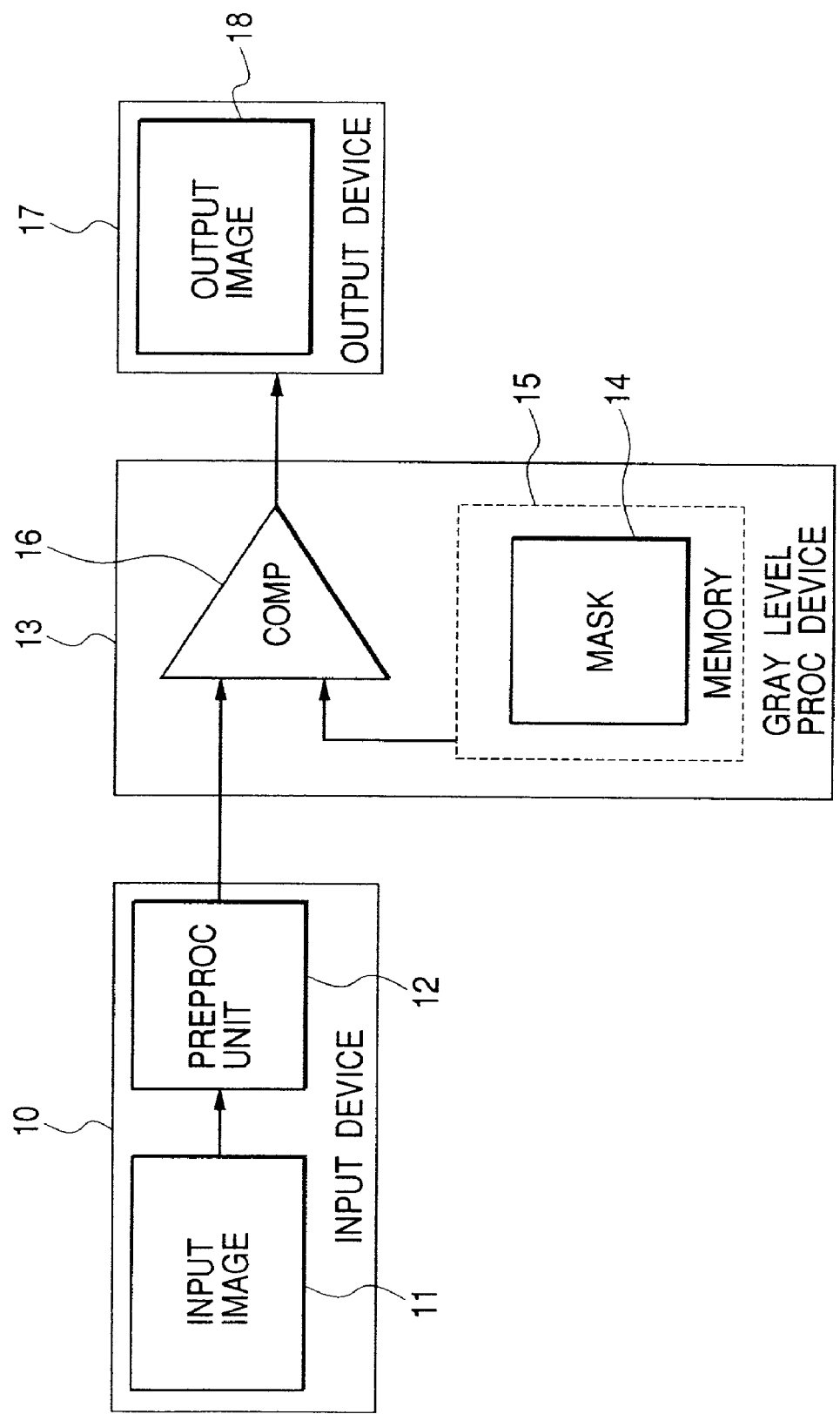
FIG. 2 is a block diagram showing a structural example of a basic system for an image process in the embodiments.

FIG. 2 is a block diagram showing a structural example of a basic system for an image process in the later-described embodiments.

In FIG. 2, numeral 10 denotes an image input device such as a scanner or the like for scanning an input image 11. In the image input device 10, a preprocessing unit 12 is provided to digitize the number of gray levels of the input image 11 having continuous gray levels into, e.g., 256 gray levels, and perform gamma correction, various color conversion and the like for the input image 11.

Numeral 13 denotes a gray level processing device which contains a memory 15 for storing a mask 14, and a comparator 16 for comparing the number of gray levels of each pixel of the input image with a corresponding mask value (threshold) and determining an output value according to the compared result.

Numeral 17 denotes an output device which outputs an output image 18 formed based on the output value from the comparator 16 in displaying manner, printing manner or the like.

[Outline of the Embodiments]

When a dot pattern which corresponds to the size of one mask created according to the embodiments is divided into smaller blocks, this dot pattern is characterized with the following regularity:

(1) the dot pattern of any of the low gray levels after the first gray level is periodic or pseudo-periodic;

(2) the dot patterns in the plural blocks are mutually the same in all the gray levels; and (3) the number of dots in each of all the blocks is equal in all the gray levels.

Further, according to circumstances, each block may be further divided into four smaller blocks, and each smaller block may be characterized with the following regularity:

(4) the number of dots in each of all the smaller blocks is equal in 4n gray levels (n is an integer).

The above regularity of the dot pattern is obtained by using the regularity of the dot pattern created by a Bayer-type systematic dithering method. Similar regularity is disclosed in Japanese Patent Application Laid-Open No. 2000-59626. By representing such the regularity in all gray level (density) areas, the dot pattern of which uniformity is high can be created.

Hereinafter, the basic mask creation method in the embodiments will be explained with reference to a flow chart shown in FIG. 1. In a step S1, the basic structure of the mask is determined, i.e., the mask size and shape are determined. If the input image is larger than the mask size, the masks are two-dimensionally arranged. In this case, how to arrange the masks is determined in the step S1.

In the embodiments, it is assumed that the 256×256 square mask for 256 gray levels is used, and if the input image is larger than the mask size, the masks regularly and repeatedly arranged longitudinally and laterally are used.

Next, the structure in the mask (i.e., the size and shape of the block, and the size and shape of the smaller block) is determined, and the plural blocks where the dot patterns are mutually the same are selected.

In the embodiments, it is assumed that the mask which has the above regularity (1) to (4) entirely is used. The block used in the regularity (3) is represented by the 16×16 square indicated by the solid line in FIG. 3, and the smaller block used in the regularity (4) is represented by the 8×8 square indicated by the dotted line in FIG. 3. Further, the blocks used in the regularity (3) that the dot patterns are mutually the same are represented by the gray-patched (or screened) blocks in FIG. 3. In the embodiments, the dot patterns representing the respective gray levels are sequentially determined from the low gray level. However, a step S2 to artificially determine the dot patterns until the certain one of the lower gray levels is roughly discriminated from a step S3 and the following step to determine the dot patterns of the gray levels higher than the gray level determined in the step S2.

It is assumed that the dot patterns of the lower gray levels determined in the step S2 are periodic or pseudo-periodic (obtained by randomizing such periodicity). By representing the periodic or pseudo-periodic dot pattern having excellent uniformity, unevenness in the low gray levels which is the problem of the blue noise masking method can be solved. Generally, there is a possibility that the periodic dot matrix causes rough pattern and moire. However, such a problem can be omitted in the low gray level because an image density is low in the low gray level.

In the embodiments, the dot patterns are determined until the second gray level dot pattern.

Figure 4:
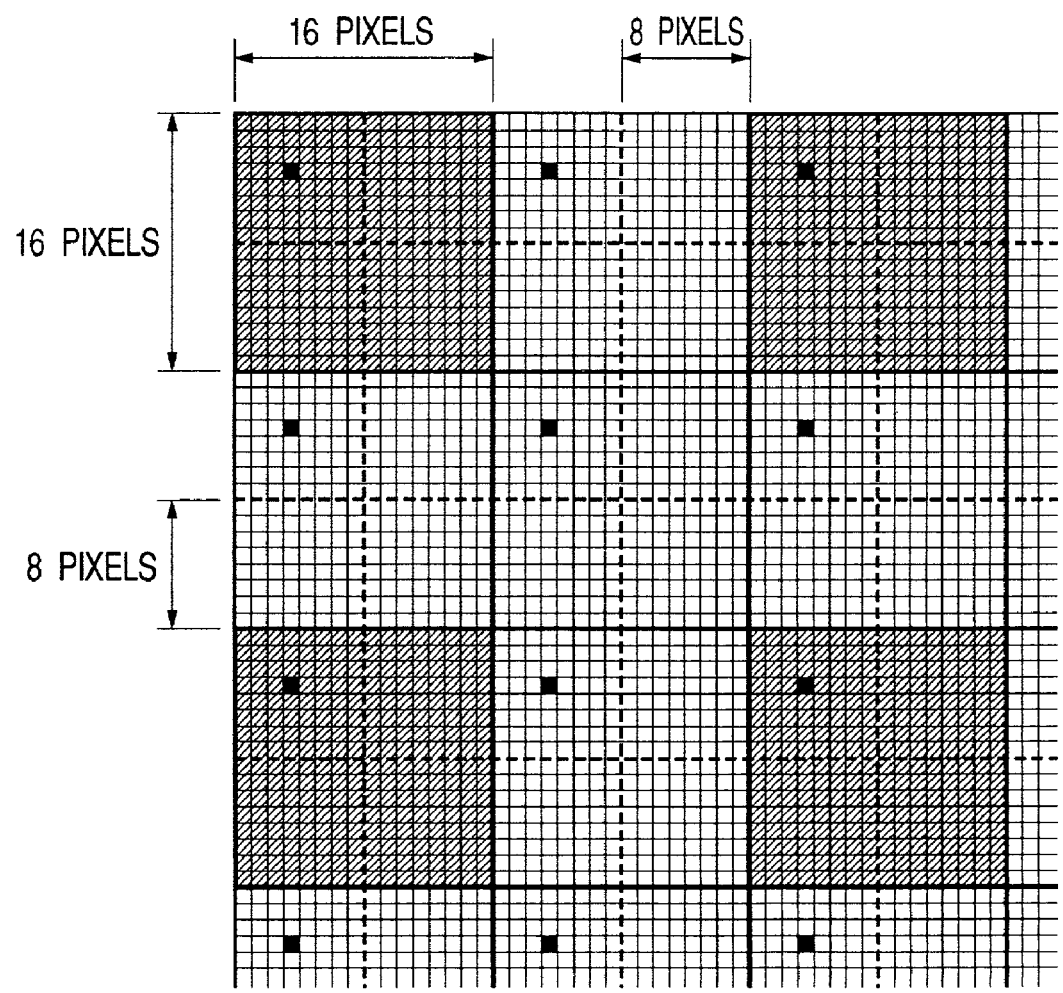
FIG. 4 is a diagram for explaining a method of creating a first gray level dot pattern in the embodiments.

FIG. 4 shows a part of the dot pattern of the first gray level determined in the step S2. In the embodiments, the periodic dot pattern is used for the first gray level. This dot pattern is the same as the dot pattern created by the Bayer-type systematic dithering method.

Figure 5:
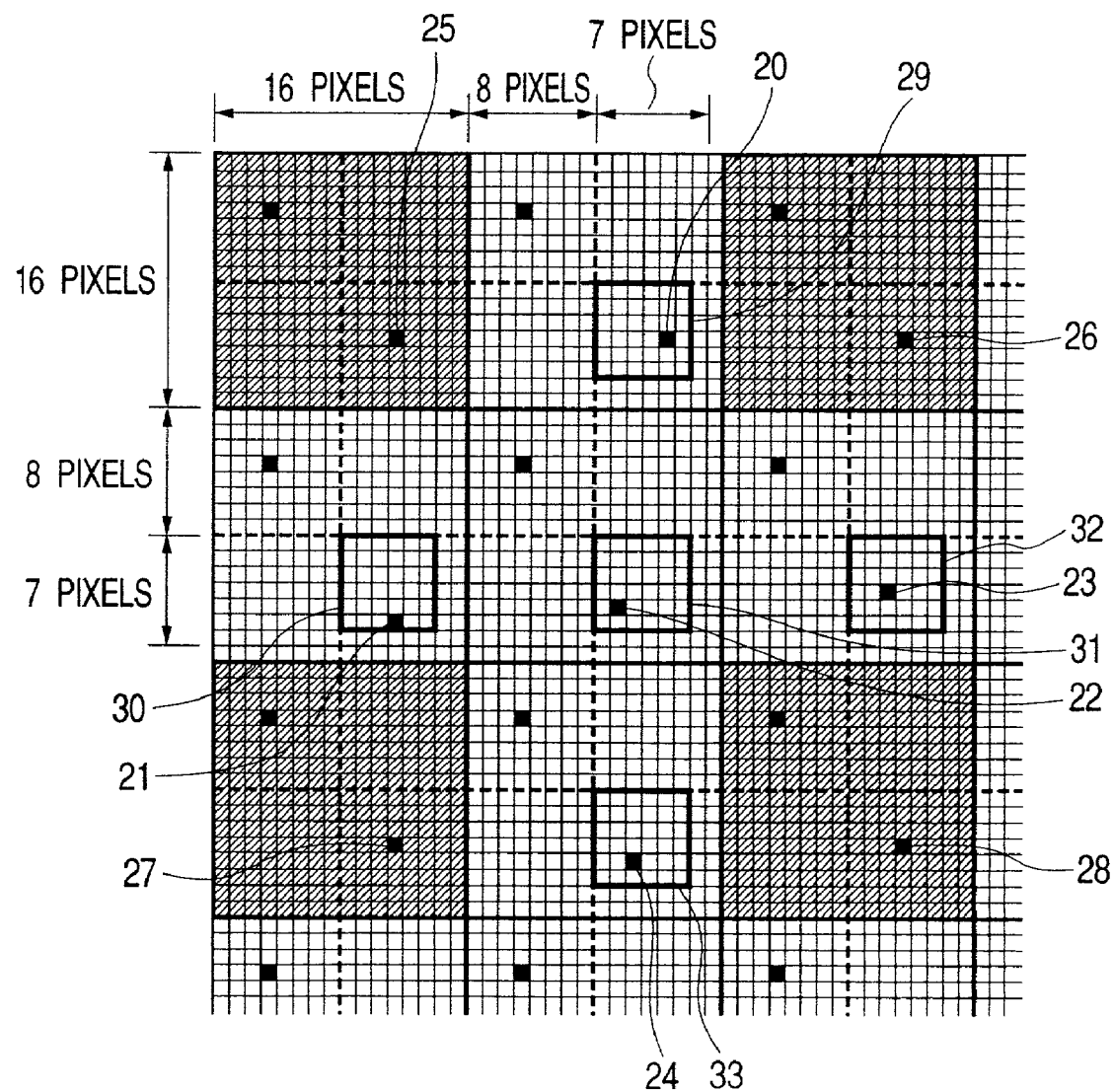
FIG. 5 is a diagram for explaining a method of creating a second gray level dot pattern in the embodiments.

FIG. 5 shows a part of the dot pattern of the second gray level determined in the step S2. The dot pattern of the second gray level is created by assigning the pseudo-periodic dots (dot patterns) as shown by the numerals 20 and 24 to the dot pattern of the first gray level.

The dots 20 and 24 are at random selected with uniform probability distribution from the frames shown by the numerals 29 and 33, respectively. In the embodiments, the size of this frame is 7×7 pixels. Incidentally, randomness is not assigned to the dots shown by the numerals 25 and 28 in the gray-patched blocks.

When the sizes and probability distributions of the frames 29 and 33 are changed within the range not breaking the regularity, the randomness can be controlled.

It should be noted that the dot patterns until the second gray level created as above satisfy the conditions necessary for the regularity (1) to (4).

In the next step S3, the dot patterns of the third and following gray levels are sequentially determined. As the step of determining the dot positions, the step S3 is roughly classified into a step S3-2 of determining the dot patterns in the gray-patched blocks and a step S3-3 of determining the dot patterns in the blocks other than the gray-patched blocks. Such a method of determining the dot patterns in the gray-patched blocks prior to the dot patterns in the blocks other than the gray-patched blocks is the point which is improved as compared with the method in Japanese Patent Application Laid-Open No. 2000-59626, and the effect of this improved method will be described later.

Hereinafter, the method of creating the dot pattern of the third gray level will be explained.

Figure 6:
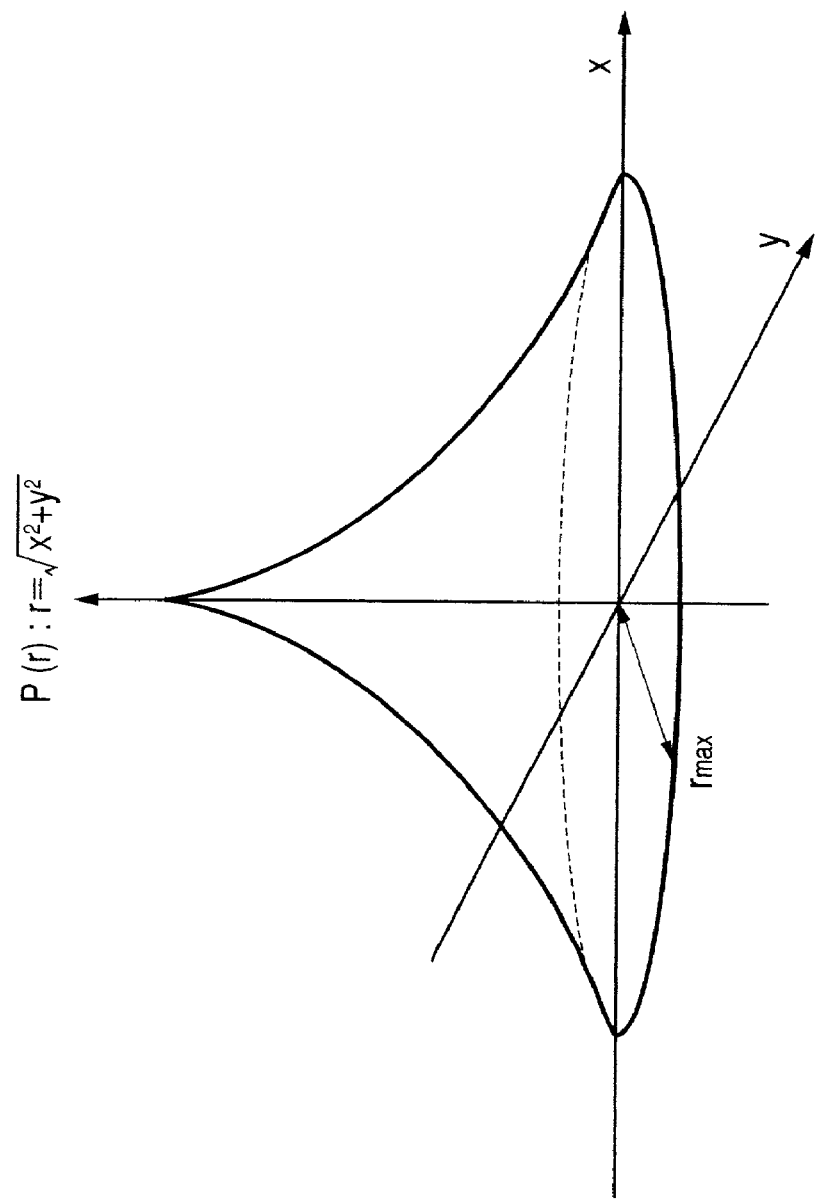
FIG. 6 is a diagram schematically showing a shape of a repulsion potential.

In a step S3-1, a repulsion potential P(r) as shown in FIG. 6 is assigned around each pixel to which the dot has been assigned until the prior gray level shown in FIG. 5, and the sum of the repulsion potentials (called the potential sum) is calculated at all the pixel positions.

Here, symbol r represents the distance from the dot to which the repulsion potential is assigned. It is assumed that $P(r)=0$ when $r > r_{max}$.

The repulsion potential represents the effect that the dots are assigned such that they are apart as much as possible. The dot pattern of the embodiments which uses the repulsion potential has high uniformity and less unevenness. The shape of the repulsion potential highly influences a tendency to arrange the dots, and the concrete shape will be described later.

Generally, the repulsion potential can have gray level dependence. When the dot pattern of the third gray level is created, the repulsion potential for the third gray level is used.

When the repulsion potential is assigned to the dot, the part overreaching the boundary of the mask is processed according to a periodic boundary condition, in consideration of how to two-dimensionally arrange the masks determined in the step S1.

Figure 7:
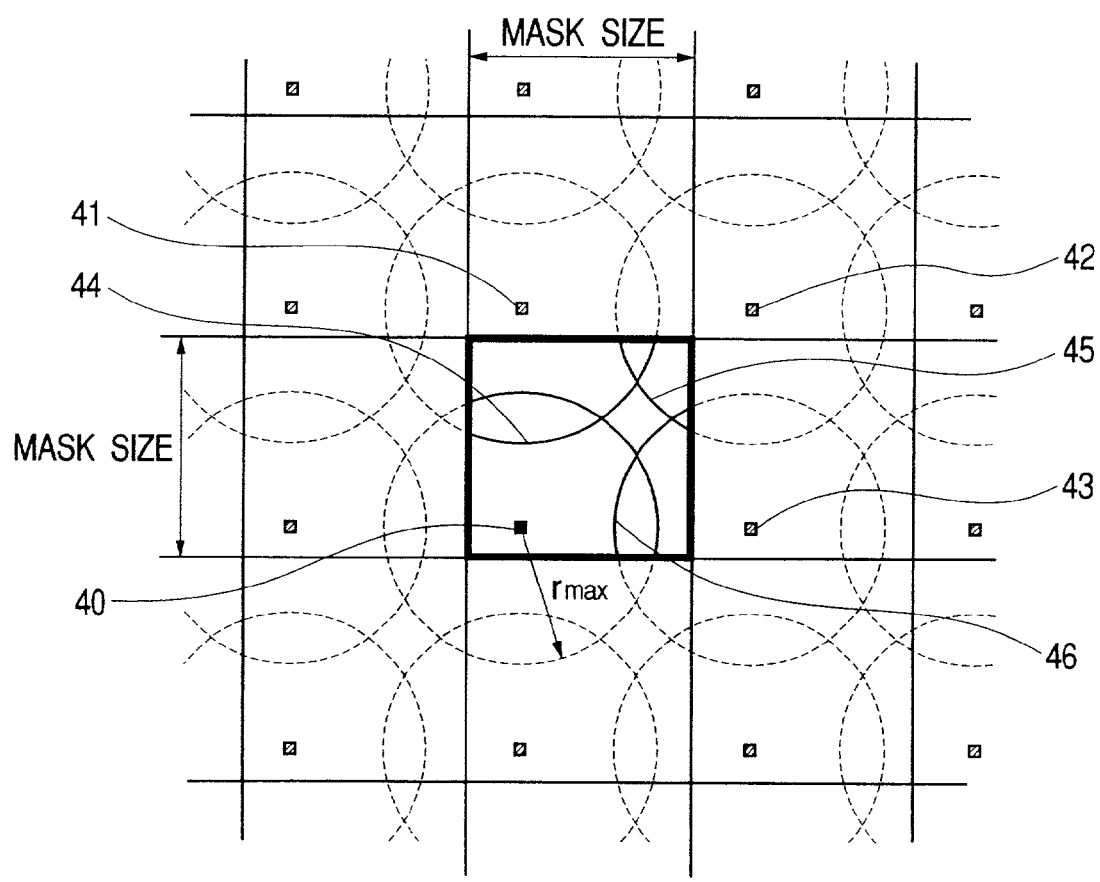
FIG. 7 is a diagram for explaining a periodic boundary condition of the repulsion potential in the embodiments.

The periodic boundary condition will be explained with reference to FIG. 7. In the embodiments, with respect to the part where the repulsion potential assigned to the dot 40 overreaches the boundary of the mask, it is considered as if this repulsion potential is assigned to the pixels of the dots 41 and 43, whereby the repulsion potential is assigned as shown by the numerals 44 and 46. By using this method, rough dot arrangement does not appear nearby the boundary of the mask when the masks are arranged for use.

Hereinafter, the periodic boundary condition is used without fail when the potential is assigned to the dot (step S3-1).

Next, the step S3-2 of determining the dot patterns in the gray-patched blocks will be explained. First, the sum of the potentials for all the 64 blocks gray patched is averaged and newly set as the potential sum of the gray-patched blocks. Namely, the potential sum is made the same for all the gray-patched blocks.

Figure 3:
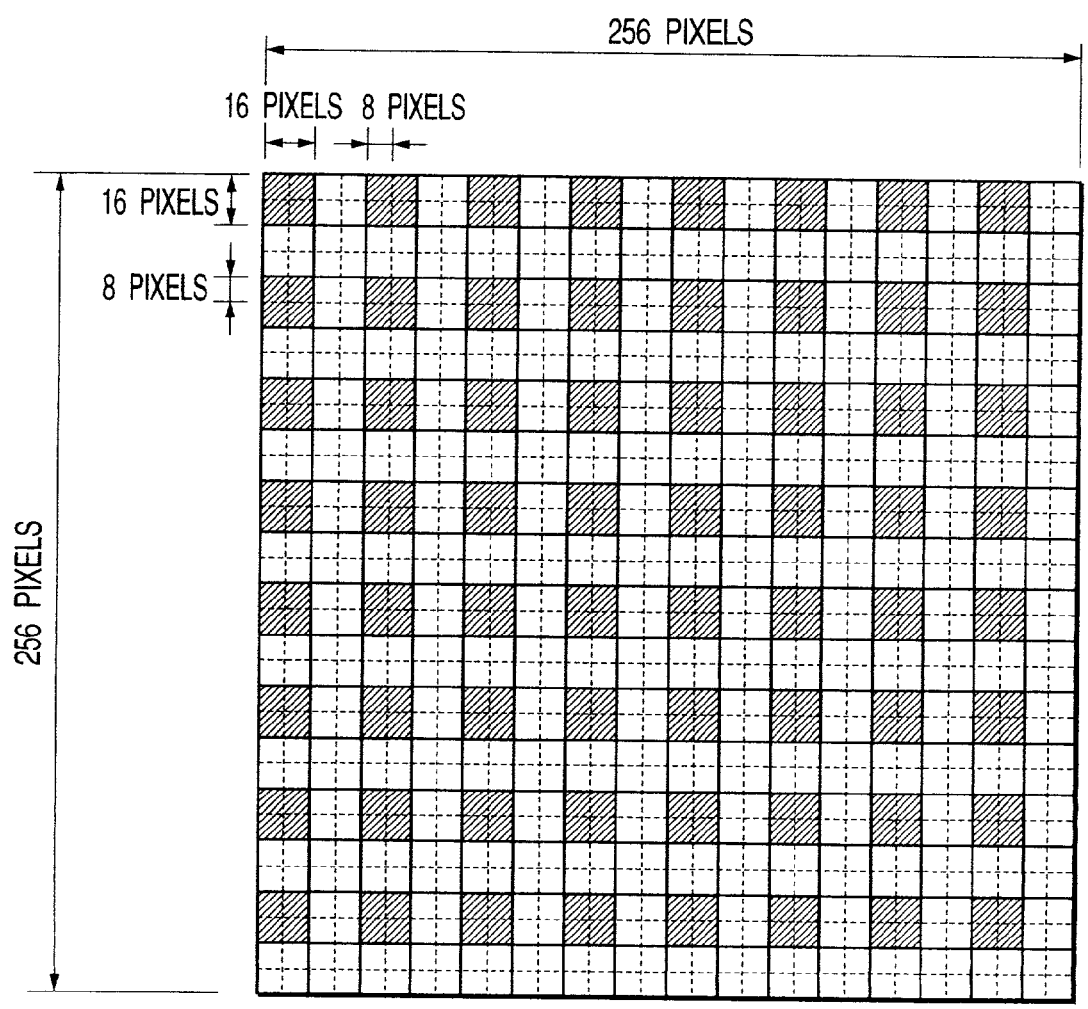
FIG. 3 is a diagram for explaining a basic structure of the mask in the embodiments.

Next, in the gray-patched blocks of FIG. 3, the pixel that the potential sum is minimum within the range not breaking the regularity (4) is obtained, and the dot is newly assigned at the position of this pixel. If there are the plural pixels that the potential sum is minimum in one block, one of these plural pixels is selected at random.

When the dot pattern of the third gray level is determined in the embodiments, in the dot pattern of the second gray level shown in FIG. 5, since the number of dot included in each of the upper left and lower right small blocks in each of the gray-patched blocks is one and the number of dot included in each of the upper right and lower left small blocks in each of the gray-patched blocks is zero, it is necessary to select the minimum point of the potential sum from the upper right and lower left small blocks in order to not break the regularity (4).

In the embodiments, there are the 64 gray-patched blocks, and all the potential sums of the respective blocks are the same. Thus, the 64 pixels include the minimum point of the potential sum, and the dots are newly assigned in regular arrangement to these 64 points.

Such the averaging operation for the potential sum is one of the methods which are added and improved with respect to the technique disclosed in Japanese Patent Application Laid-Open No. 2000-59626. By this operation, conformity (nonuniformity) of the dot patterns at a boundary of the blocks where the dot patterns are mutually the same can be remarkably improved.

In the method disclosed in Japanese Patent Application Laid-Open No. 2000-59626, when the dot patterns of the blocks to be gray-patched are determined, a dot is assigned at the pixel position where the unaveraged sum of the potentials is minimum, and dots are assigned at the corresponding positions in the blocks (63 blocks in this case) other than the block including the dot at the position of the minimum potential sum. By such the dot position determination method, dot arrangement nearby the outside of the boundary of the 64 blocks is not considered, the dots might be non-uniformly arranged at the boundaries of the gray-patched blocks.

On the other hand, in the embodiments, by using the averaged potential, the dot arrangement nearby the outside of the boundary of the 64 gray-patched blocks is discriminated overall, and the position of the dot to be assigned can be determined. Thus, the above problem of the non-uniformly arranged dots can be improved.

Next, the potential is assigned to each dot at a corresponding location in each of the 64 blocks, and the sum of the potentials is recalculated (step S3-2).

Next, the step S3-3 will be explained. First, the pixel that the potential sum is minimum is searched within the range not breaking the regularity (3) and (4), and one dot is assigned in this pixel.

Namely, the pixel that the potential sum is minimum is searched in the upper right and lower left small blocks in each of the blocks other than the gray-patched blocks, and the dot is assigned in this pixel. Further, the potential is assigned around this pixel, and the potential sum is recalculated.

Similarly, the next dot position is determined. First, the pixel that the potential sum is minimum is searched within the range not breaking the regularity (3) and (4). Namely, the next dot position is searched in the upper right and lower left small blocks in each of the blocks not including the dot newly assigned at the third gray level.

The dot is assigned to this pixel, the potential is assigned around this pixel, and the potential sum is recalculated.

By repeating the above process, the dots of the number necessary to represent the third gray level are assigned, whereby the dot pattern of the third gray level is created. In the dot pattern of the third gray level created as above, since the three dots are assigned in each of all the 16×16 blocks, the regularity (3) is satisfied (step S3-3).

As described above, the method of previously assigning the dot arrangement in the gray-patched blocks in the case of determining the dot pattern of one gray level is the method which is improved with respect to the technique disclosed in Japanese Patent Application Laid-Open No. 2000-59626. In this improved method, since the gray-patched blocks are regularly arranged, the 64 dots assigned in the gray-patched blocks are regularly arranged. Thus, by previously creating such the extremely uniform dot pattern, there is an effect that uniformity of all the dot patterns can be improved.

The dot patterns of the fourth gray level and the following are sequentially determined by repeating the processes in the steps S3-1 to S3-3. However, in a case where the repulsion potential has gray level dependence, when the dot pattern is created, it is necessary to use the repulsion potential for the corresponding gray level.

For example, in a case where the dot pattern of the fourth gray level is determined, when the potential sum is calculated in the step S3-1, the repulsion potential for the third gray level which has been assigned to the dot pattern of the third gray level is once cancelled. Then, the potential sum is recalculated by using the repulsion potential for the fourth gray level, and this repulsion potential for the fourth gray level is used in the steps S3-2 and S3-3.

In the dot pattern of the fourth gray level which is created as above, since one dot is assigned in each of the small blocks, the regularity (4) is satisfied.

When all the dot patterns until the dot pattern of the maximum gray level (255th gray level) are determined and accumulated, the mask which outputs the dot patterns when an input image of uniform gray level is subjected to the halftone gray level process can be created.

Namely, it is assumed that the coordinates representing the pixel position is given as (x, y) and the dot pattern of a g-th gray level is given as d(g; x, y). In this case, if d(g; x, y)=1 (dot has been assigned) or 0 (dot is not assigned), it is possible to represent that a mask $$m(x, y) = 256 - \sum_{g=1}^{255} d(g; x, y)$$

(step S4).

The basic method of creating the mask in the embodiments was explained. Incidentally, it is possible to execute only either the method of previously assigning the dot pattern in the gray-patched block or the method of using the averaged potential sum, which methods are the remarkable improved points with respect to the technique in Japanese Patent Application Laid-Open No. 2000-59626.

Further, the tendency of the dot arrangement can be freely and widely controlled in accordance with how to determine the basic mask structure in the step S1, how to determine the dot pattern in the low gray level in the step S2, and how to determine the shape of the repulsion potential in the step S3. Thus, the dot pattern suitable for the characteristic of the output device can be achieved.

Hereinafter, the various embodiments of the present invention will be explained.

(First Embodiment)

The procedure of creating one of the masks having the feature according to the present embodiment will be explained with reference to the flow chart shown in FIG. 1.

Figure 8:
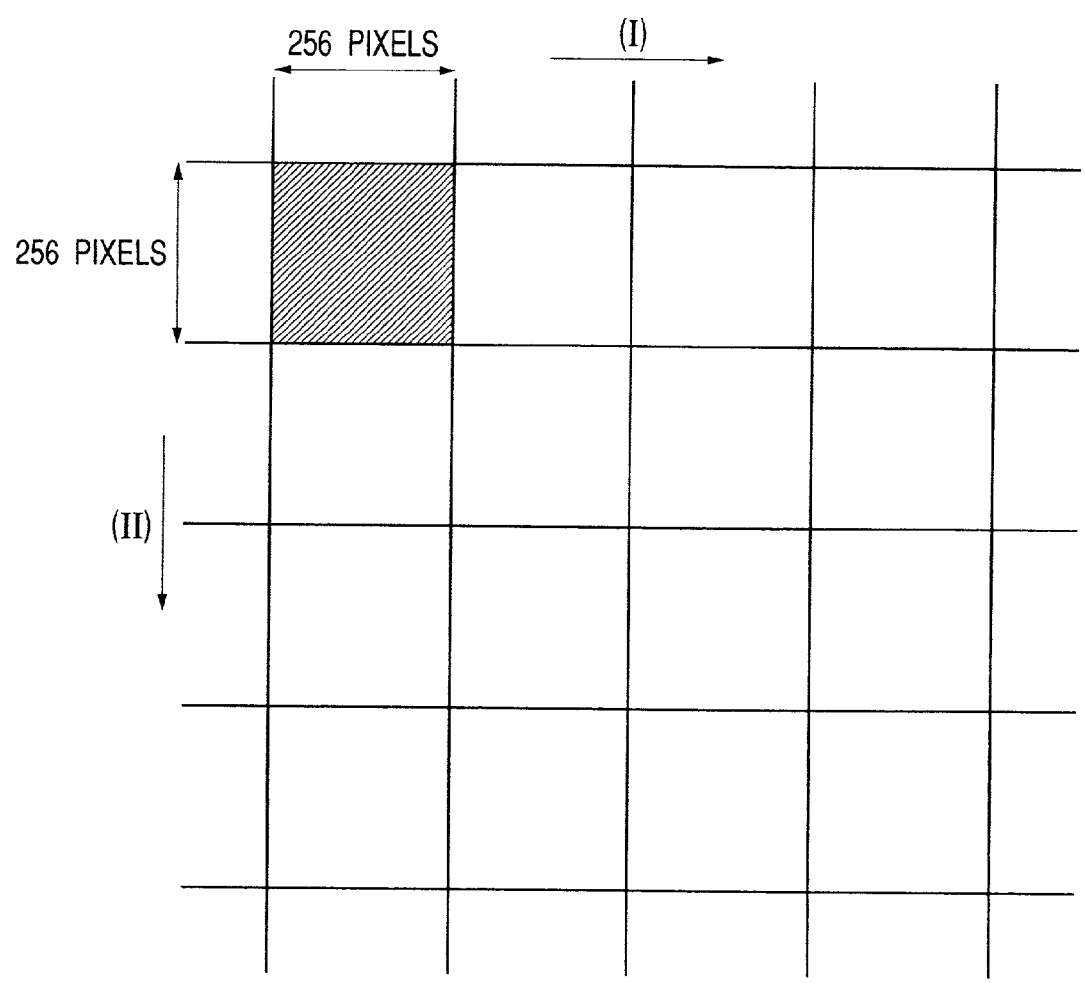
FIG. 8 is a diagram showing a mask shape and a mask arrangement method in the first embodiment.

First, in the step S1, the basic structure of the mask is determined. The mask in the present embodiment is the 256×256 square mask for 256 gray levels. FIG. 8 is a diagram showing the method of arranging the mask when the input image is larger than the mask.

In FIG. 8, the gray 256×256 pixels correspond to the size of one mask. In a case where the output device is a printer, the direction (I) represents the main scan direction such as an ink emission head direction or the like, and the direction (II) is the sub scan direction such as a sheet feed direction or the like.

When the dot pattern of the 256×256 pixels created by using the mask of the present embodiment is divided into the blocks each including the 16×16 pixels as indicated by the solid line in FIG. 3 and further divided into the smaller blocks each including the 8×8 pixels as indicated by the dotted line in FIG. 3, this dot pattern has the following regularity:

(1) the dot pattern of the first gray level is the pseudo-periodic dot pattern;

(2) the dot patterns in the plural blocks are mutually the same in all the gray levels;

(3) the number of dots in each of all the blocks is equal in all the gray levels; and (4) the number of dots in each of all the smaller blocks is equal in 4n gray levels (n is an integer).

Here, it is assumed that the blocks of the regularity (2) where the dot patterns are mutually the same are the gray-patched 64 blocks each including the 16×16 pixels shown in FIG. 3.

Next, in the step S2, the dot patterns of the lower gray levels are determined. In the present embodiment, in the step S2 of FIG. 1, the dot pattern until the first gray level is determined.

Figure 9:
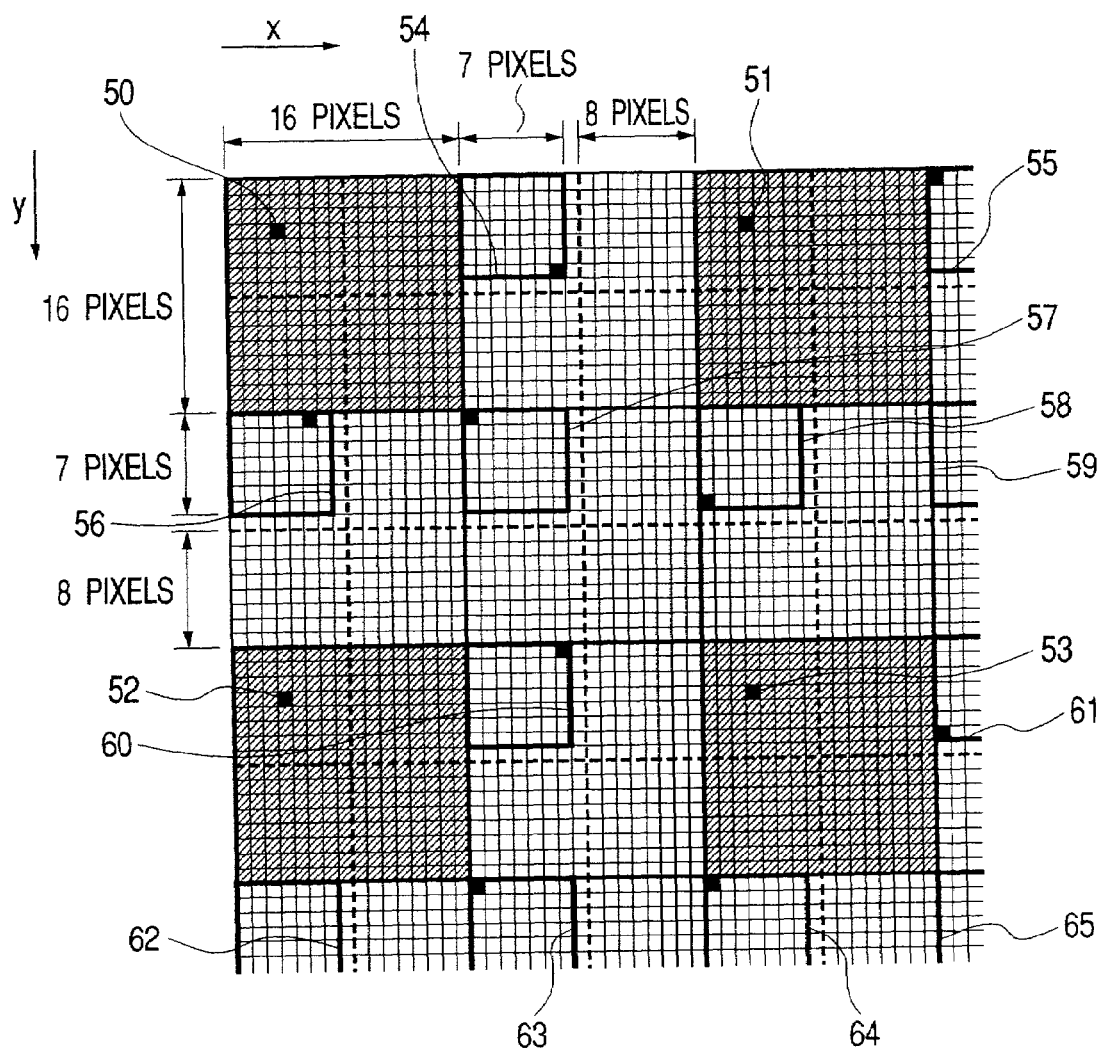
FIG. 9 is a diagram for explaining a method of creating a first gray level dot pattern in the first embodiment.

Hereinafter, the method of creating the dot pattern of the first gray level will be explained with reference to FIG. 9. However, it should be noted that only a part of the dot pattern is illustrated for the convenience of the drawing. In FIG. 9, since the position of lateral x-th pixel and longitudinal y-th pixel from the upper left pixel in the mask is represented by the coordinate (x, y), the upper left pixel is represented by the coordinate (0, 0).

Randomness is not assigned to the dots 50 and 53 which are assigned in the blocks where the dot patterns are mutually the same, and the dot position is given by the coordinate (32m+3, 32n+3) (m=0, 1, . . ., 7 and n=0, 1, . . ., 7).

On the other hand, randomness is assigned to the 256 dots which are assigned in the blocks other than the blocks where the dot patterns are mutually the same. In the present embodiment, the dot is selected at random from one of the four corners of the block of the 7×7 pixels as shown by the thick line in FIG. 9, at a probability of ¼.

The pseudo-periodic dot pattern of the first gray level is completed as above. It should be noted that this pattern satisfies the condition necessary for the regularity (1) and (4).

Next, the method of creating the dot patterns of the second gray level and the following in the step S3 will be explained. The dot patterns of the second gray level and the following are created by using the repulsion potential. In the present embodiment, a repulsion potential P(g, r) used to perform the process in the step S3 of FIG. 1 is given by P(g, r)=exp{−axr/$\sqrt{256/g}$} (r≦$r_{max}$) or 0 (r>$r_{max}$). Here, it is assumed that $r_{max}$ is 128 and "a" is 0.46. Further, "r" which represents the distance from the pixel to which the repulsion potential is assigned is given by r=$\sqrt{(x-x_0)^2+(y-y_0)^2}$. However, to shorten the calculation time, the repulsion potential of the 70th gray level is used as the repulsion potentials of the 71st gray level and the following, i.e., P(g>70, r)= P(g=70, r).

As described above, this repulsion potential is assigned to all the already-assigned dots, and at this time, the part overreaching the boundary of the mask is processed by using the periodic boundary condition. In the following steps, this periodic boundary condition is used whenever need arises (step S3-1).

Next, in the blocks where the dot patterns are mutually the same, the averaging operation for the potential sum is performed, whereby the potential sum of each of all the 64 blocks where the dot patterns are mutually the same becomes the same.

Next, the pixel that the potential sum is minimum is searched within the range not breaking the regularity (4), one dot is assigned to each of the blocks where the dot patterns are mutually the same (i.e., the total 64 dots are assigned), and the potential is assigned to each of the 64 dots, whereby the potential sum is recalculated (step S3-2).

Next, the pixel that the potential sum is minimum is searched within the range not breaking the regularity (3) and (4), the dot is assigned to this pixel, and the potential is then assigned around this pixel, whereby the potential sum is recalculated. By repeating the above process, the 194 dots are assigned, whereby the dot pattern of the second gray level is created (step S3-3).

The third gray level and the following are determined by the same operations as those in the steps S3-1 to S3-3. When the dot patterns until the dot pattern of the maximum gray level are determined and accumulated, the mask is created (step S4).

Figure 10:
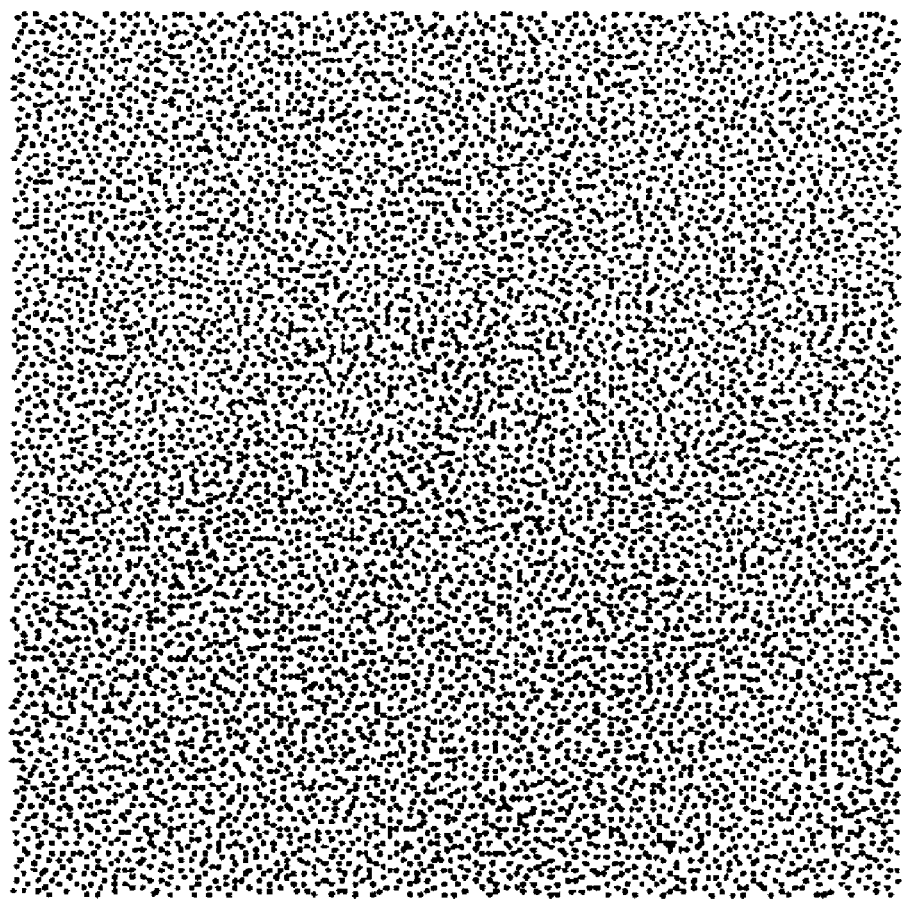
FIG. 10 is a diagram showing a dot pattern of 256×256 pixels of 32 gray levels in the first embodiment.

FIG. 10 shows the dot pattern of the 32nd gray level which is created in the present embodiment. In FIG. 10, it is possible to understand that an extremely uniform and even dot pattern can be obtained.

Further, since the optimum shape of the repulsion potential is different according to performance (e.g., resolution) of an output device, trial and error are necessary to determine the shape of the repulsion potential. However, generally when the repulsion potential is used for a higher-resolution device, it is known that it is effective to use the shape with slow attenuation.

As described above, in the present embodiment, by improving the method in Japanese Patent Application Laid-Open No. 2000-59626, the uniformity of the dot pattern is further improved, whereby it is possible to obtain the dot pattern that solved the problem of texture.

(Second Embodiment)

The method of creating one of the masks having the feature according to the present embodiment will be explained with reference to the flow chart shown in FIG. 1.

First, in the step S1, the basic structure of the mask is determined. The mask in the present embodiment is the 256×256 square mask for 256 gray levels. When the input image is larger than the mask size, the mask is repeatedly used while being shifted toward the longitudinal direction by the 128 pixels as shown in FIG. 11.

Figure 11:
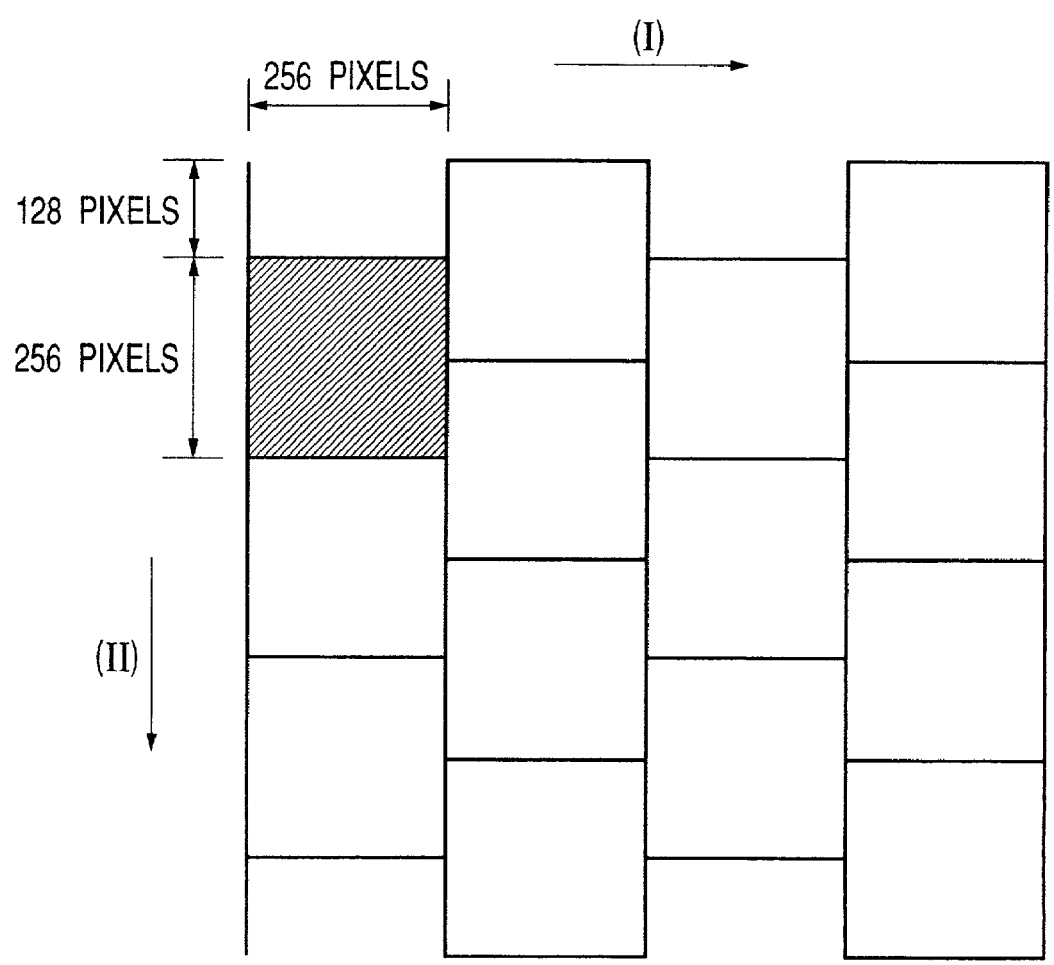
FIG. 11 is a diagram showing a mask shape and a mask arrangement method in the second embodiment.

In FIG. 11, the gray 256×256 pixels correspond to the size of one mask. In a case where the output device is a printer, the direction (I) represents the main scan direction such as an ink emission head direction or the like, and the direction (II) is the sub scan direction such as a sheet feed direction or the like.

Figure 12:
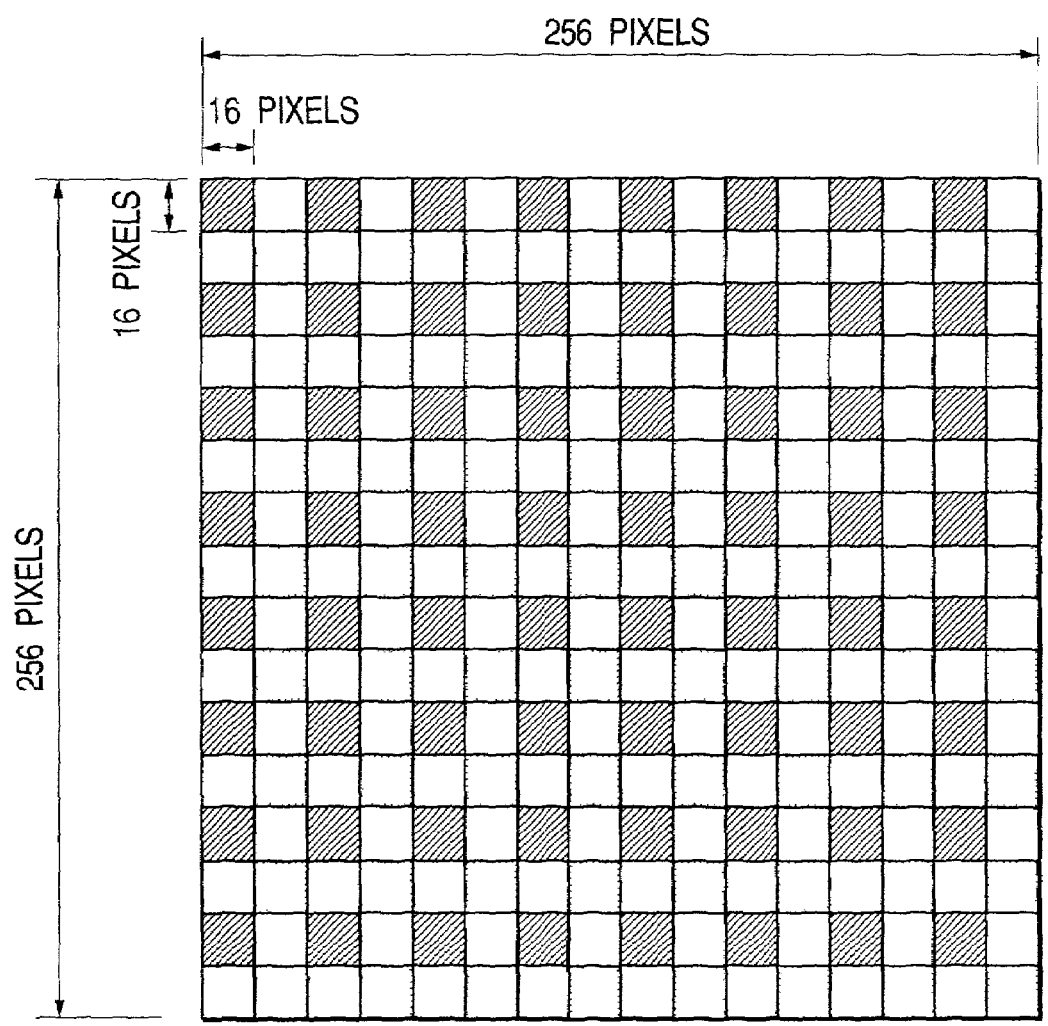
FIG. 12 is a diagram for explaining a basic structure of the mask in the second embodiment.

When the dot pattern of the 256×256 pixels created by using the mask of the present embodiment is divided into the blocks each including the 16×16 pixels as indicated by the solid line in FIG. 12, this dot pattern has the following regularity:

(1) the dot pattern of the first gray level is the pseudo-periodic dot pattern;

(2) the dot patterns in the plural blocks are mutually the same in all the gray levels; and (3) the number of dots in each of all the blocks is equal in all the gray levels.

In the present embodiment, there are two kinds of blocks of the regularity (2) where the dot patterns are mutually the same. Namely, in FIG. 12, in the thin gray-patched 64 blocks, the dot patterns are made mutually the same, and in the dark gray-patched 64 blocks, the dot patterns are also made mutually the same.

Figure 1:
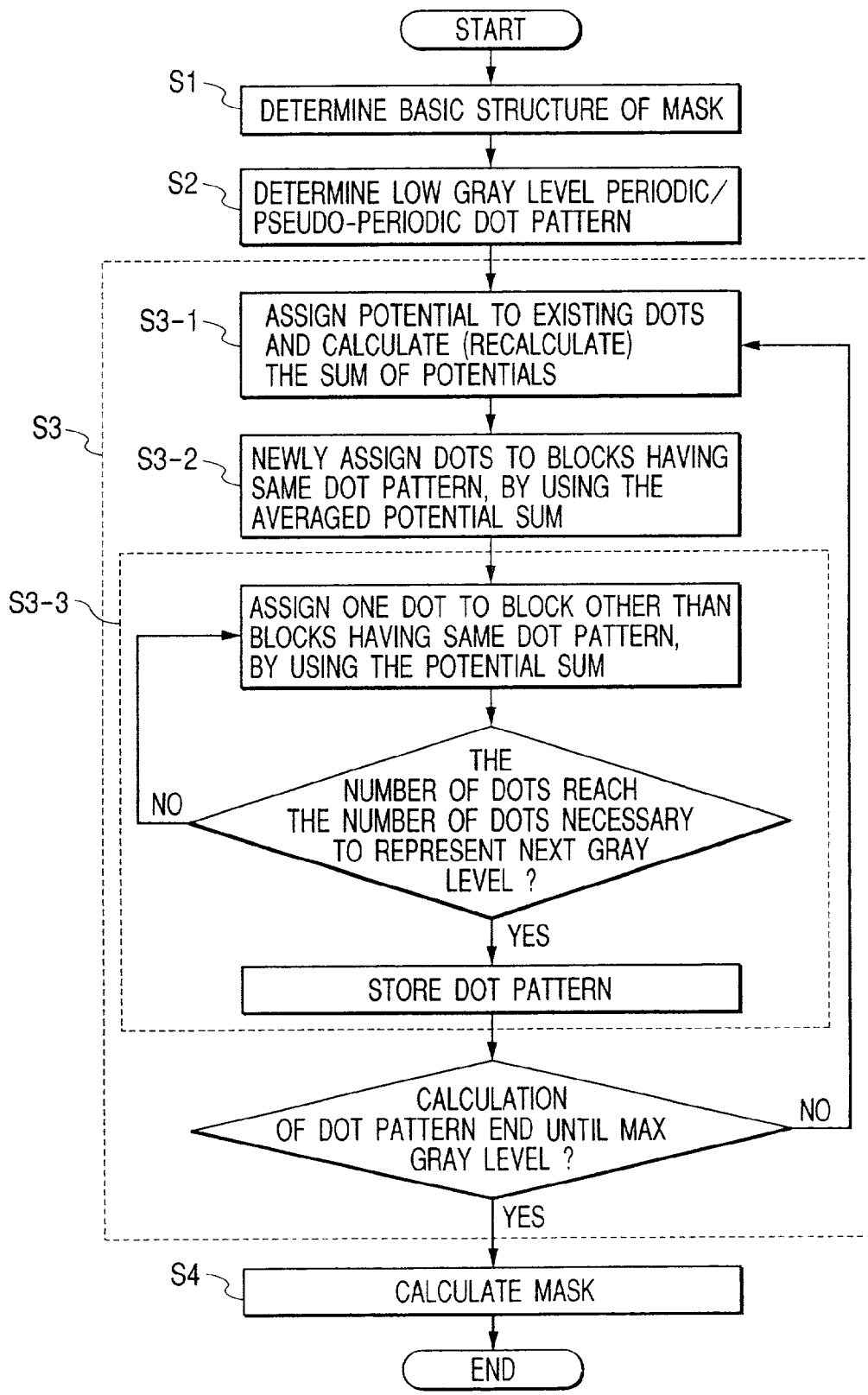
FIG. 1 is a flow chart showing a procedure to create a mask in the embodiments.
Figure 13:
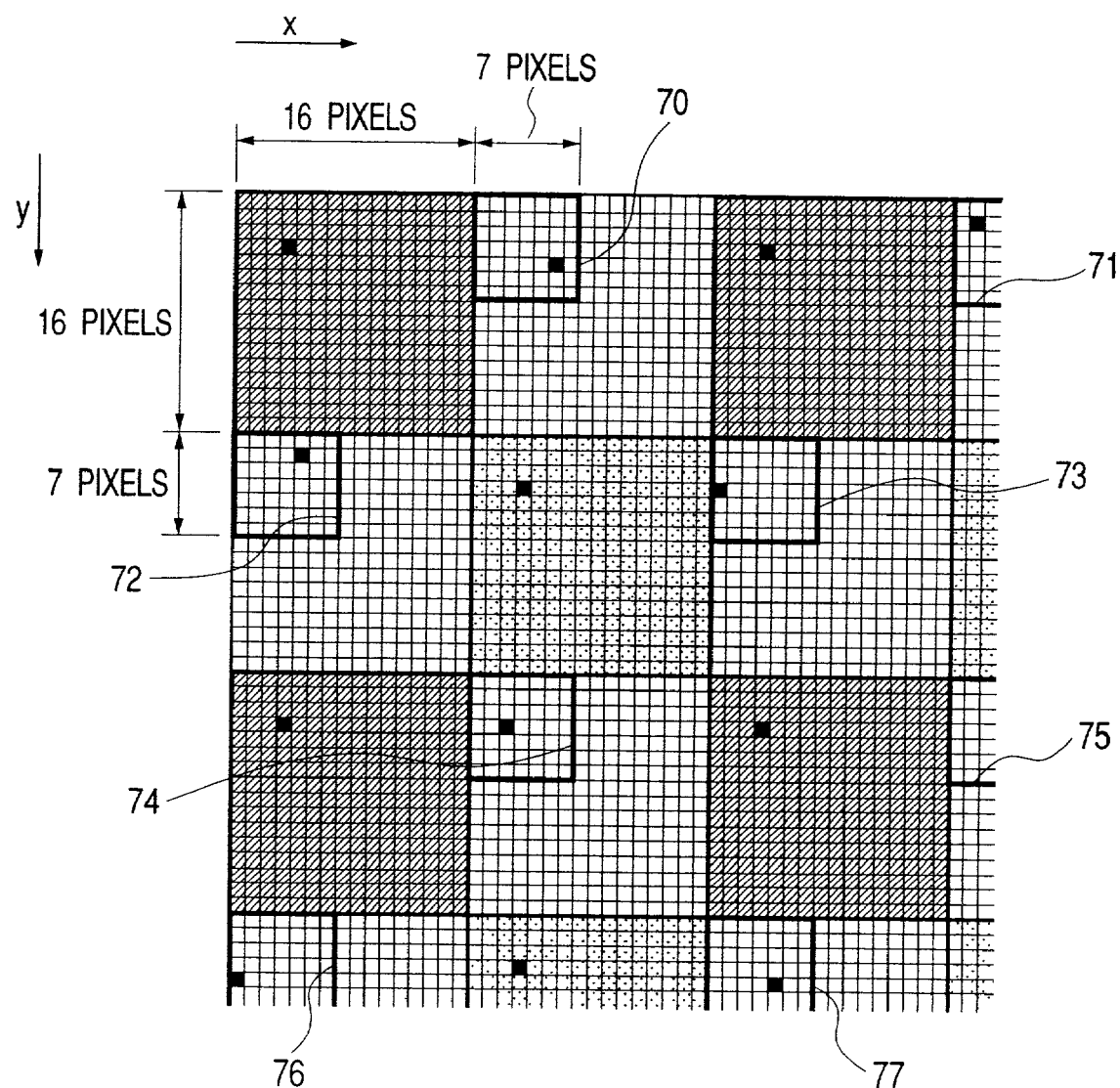
FIG. 13 is a diagram for explaining a method of creating a first gray level dot pattern in the second embodiment.

In the present embodiment, in the step S2 of FIG. 1, the dot pattern until the first gray level is determined. Hereinafter, the method of creating the dot pattern of the first gray level will be explained with reference to FIG. 13. However, it should be noted that only a part of the dot pattern is illustrated for the convenience of the drawing. In FIG. 13, since the position of lateral x-th pixel and longitudinal y-th pixel from the upper left pixel in the mask is represented by the coordinate (x, y), the upper left pixel is represented by the coordinate (0, 0).

Randomness is not assigned to the 128 dots which are assigned in the blocks where the dot patterns are mutually the same, and the dot position is given by the coordinates (32m+3, 32n+3) and (32m+11, 32n+11) (m=0, 1, . . . , 7 and n=0, 1, . . . , 7).

On the other hand, randomness is assigned to the 128 dots which are assigned in the blocks other than the blocks where the dot patterns are mutually the same. In the present embodiment, the dot is selected at random from the blocks of the 7×7 pixels as shown by the thick line (e.g., blocks 70 and 77 in FIG. 13), with a uniform probability distribution.

The pseudo-periodic dot pattern of the first gray level is completed as above.

Next, the method of creating the dot patterns of the second gray level and the following in the step S3 will be explained. As described above, the dot patterns of the second gray level and the following are created by using the repulsion potential.

In the present embodiment, a repulsion potential P(g, r) used to perform the process in the step S3 of FIG. 1 is the same as that in the first embodiment.

Figure 14:
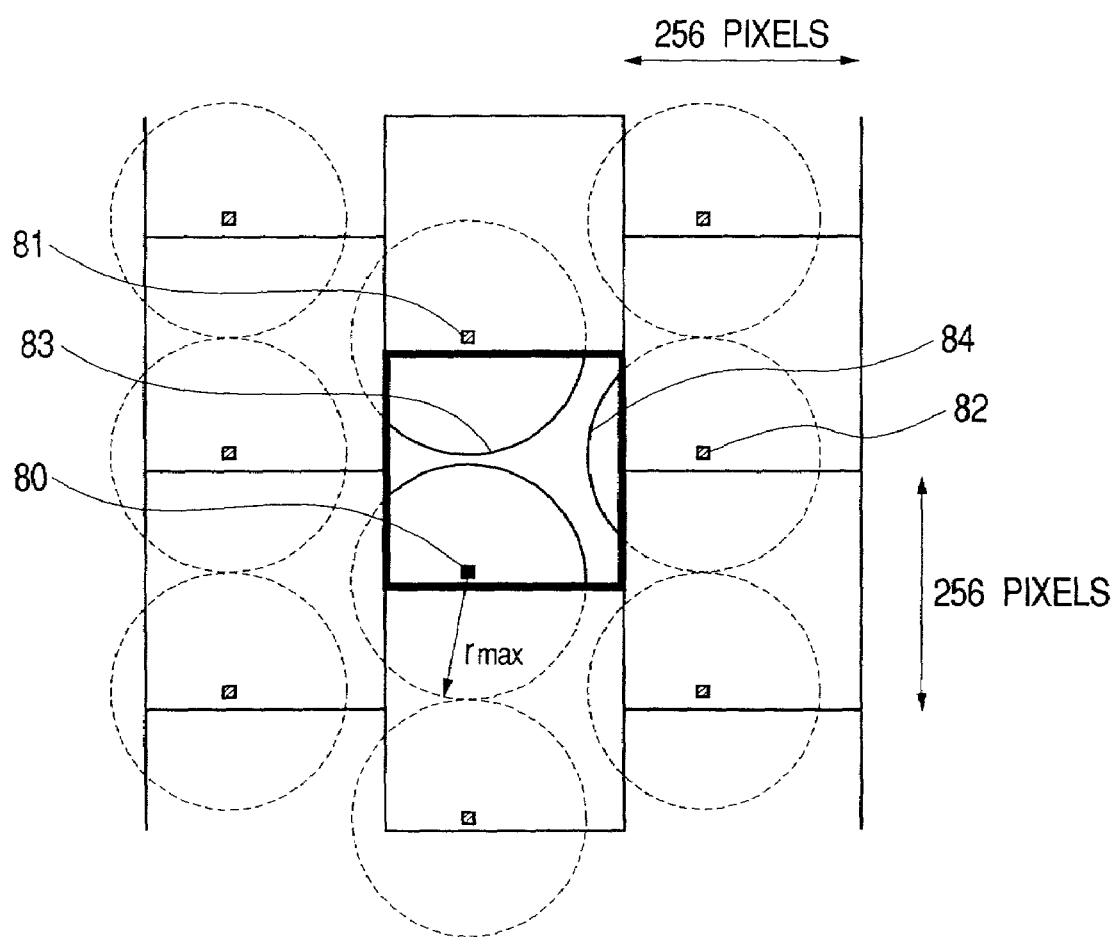
FIG. 14 is a diagram for explaining a periodic boundary condition of a repulsion potential in the second embodiment.

As described above, this repulsion potential is first assigned to all the already-assigned dots, and at this time, the part overreaching the boundary of the mask is processed by using the periodic boundary condition. The periodic boundary condition will be explained with reference to FIG. 14.

In the present embodiment, with respect to the part where the repulsion potential assigned to the pixel 80 overreaches the boundary of the mask, it is considered as if this repulsion potential is assigned to the pixels of the dots 81 and 82, whereby the repulsion potential is assigned as shown by the numerals 83 and 84. Hereinafter, the periodic boundary condition is used without fail when the repulsion potential is used (step S3-1).

Next, in the blocks where the dot patterns are mutually the same (e.g., the dark gray-patched blocks), the averaged potential is obtained and set to be the new potential sum. Next, the pixel that the potential sum is minimum is searched, the 64 dots are assigned, and the potential is assigned to each of the 64 dots, whereby the potential sum is recalculated.

Next, in the other blocks where the dot patterns are mutually the same (e.g., the light gray-patched blocks), the averaged potential is obtained and set to be the new potential sum. Next, the pixel that the potential sum is minimum is searched, the 64 dots are assigned, and the potential is assigned to each of the 64 dots, whereby the potential sum is recalculated (step S3-2).

Next, the pixel that the potential sum is minimum is searched within the range not breaking the regularity (3), the dot is assigned to this pixel, and the potential is then assigned around this pixel, whereby the potential sum is recalculated. By repeating the above process, the 128 dots are assigned one by one, whereby the dot pattern of the second gray level is created (step S3-3).

The third gray level and the following are determined by the same operations as those in the steps S3-1 to S3-3. When the dot patterns until the dot pattern of the maximum gray level are determined and accumulated, the mask is completed (step S4).

Figure 15:
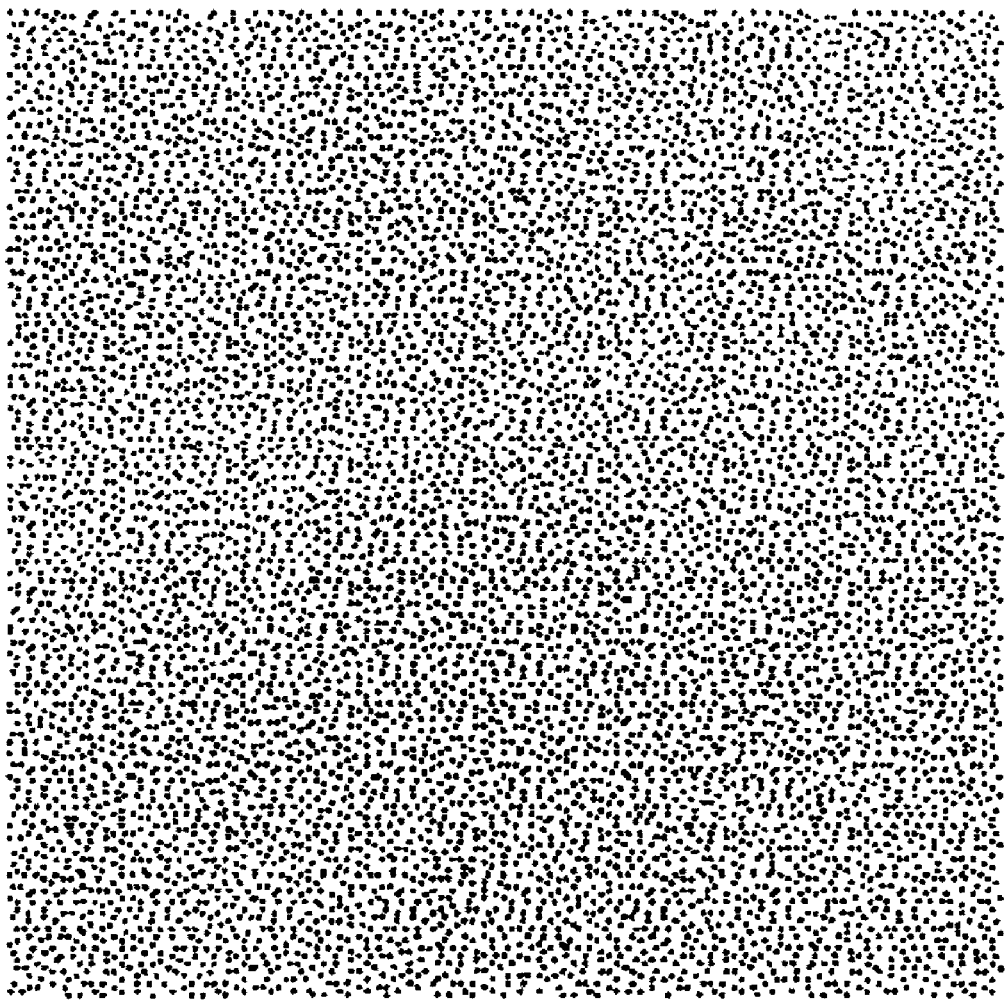
FIG. 15 is a diagram showing a dot pattern of 256× 256 pixels of 32 gray levels in the second embodiment.

FIG. 15 shows the dot pattern of the 32nd gray level which is created in the present embodiment. In FIG. 15, it is possible to understand that an extremely uniform and even dot pattern can be obtained.

Since the mask arrangement in the present embodiment is not parallel with the main scan direction, it is possible to reduce a problem that streaky unevenness mechanically appears in the sub scan direction of an ink-jet printer or the like.

(Third Embodiment)

The method of creating one of the masks having the feature according to the present embodiment will be explained with reference to the flow chart shown in FIG. 1.

First, in the step S1, the basic structure of the mask is determined. The mask in the present embodiment is suitable for 256 gray levels. When the input image is larger than the mask size, the mask is repeatedly used according to a method as explained with respect to FIG. 16.

Figure 16:
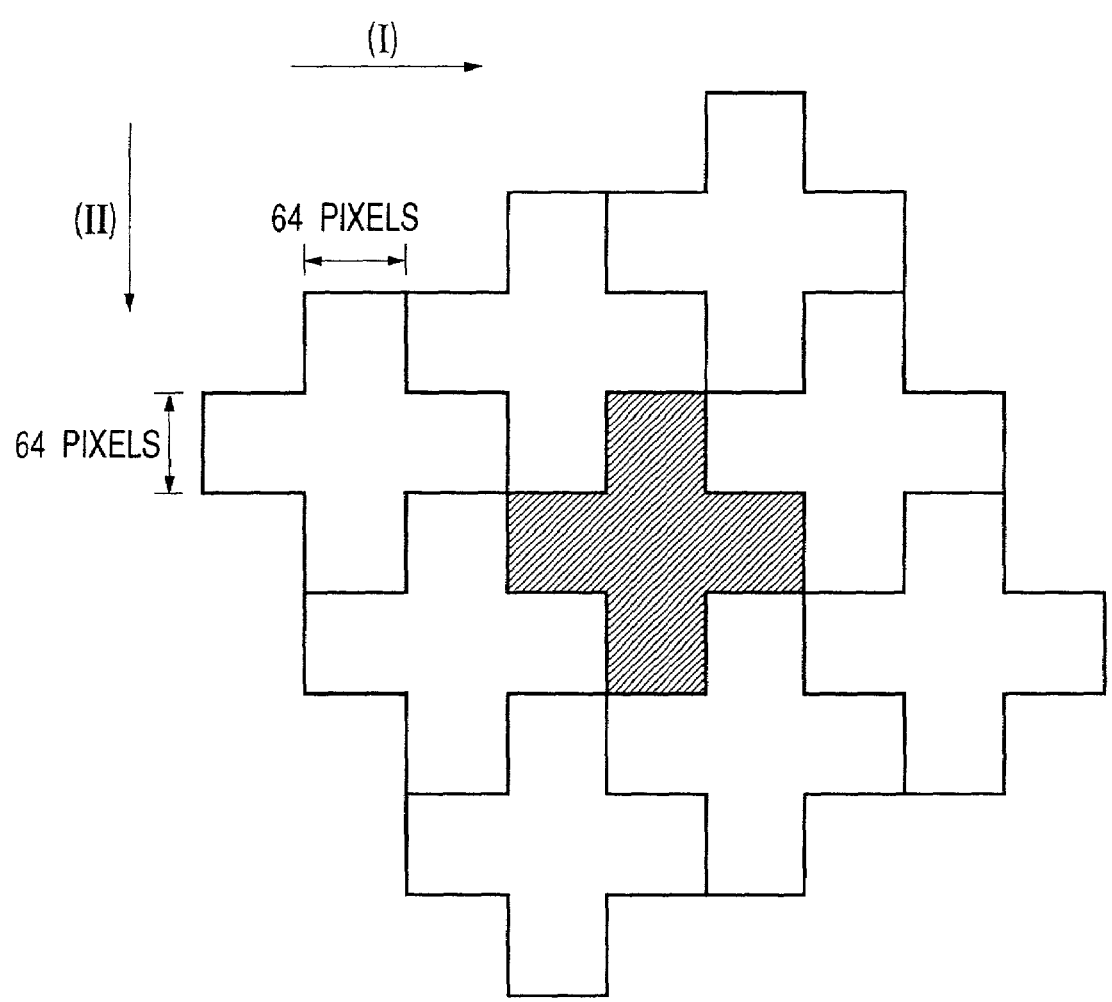
FIG. 16 is a diagram showing a mask shape and a mask arrangement method in the third embodiment.

In FIG. 16, the gray cross corresponds to the size of one mask. In a case where the output device is a printer, the direction (I) represents the main scan direction such as an ink emission head direction or the like, and the direction (II) is the sub scan direction such as a sheet feed direction or the like.

Figure 17:
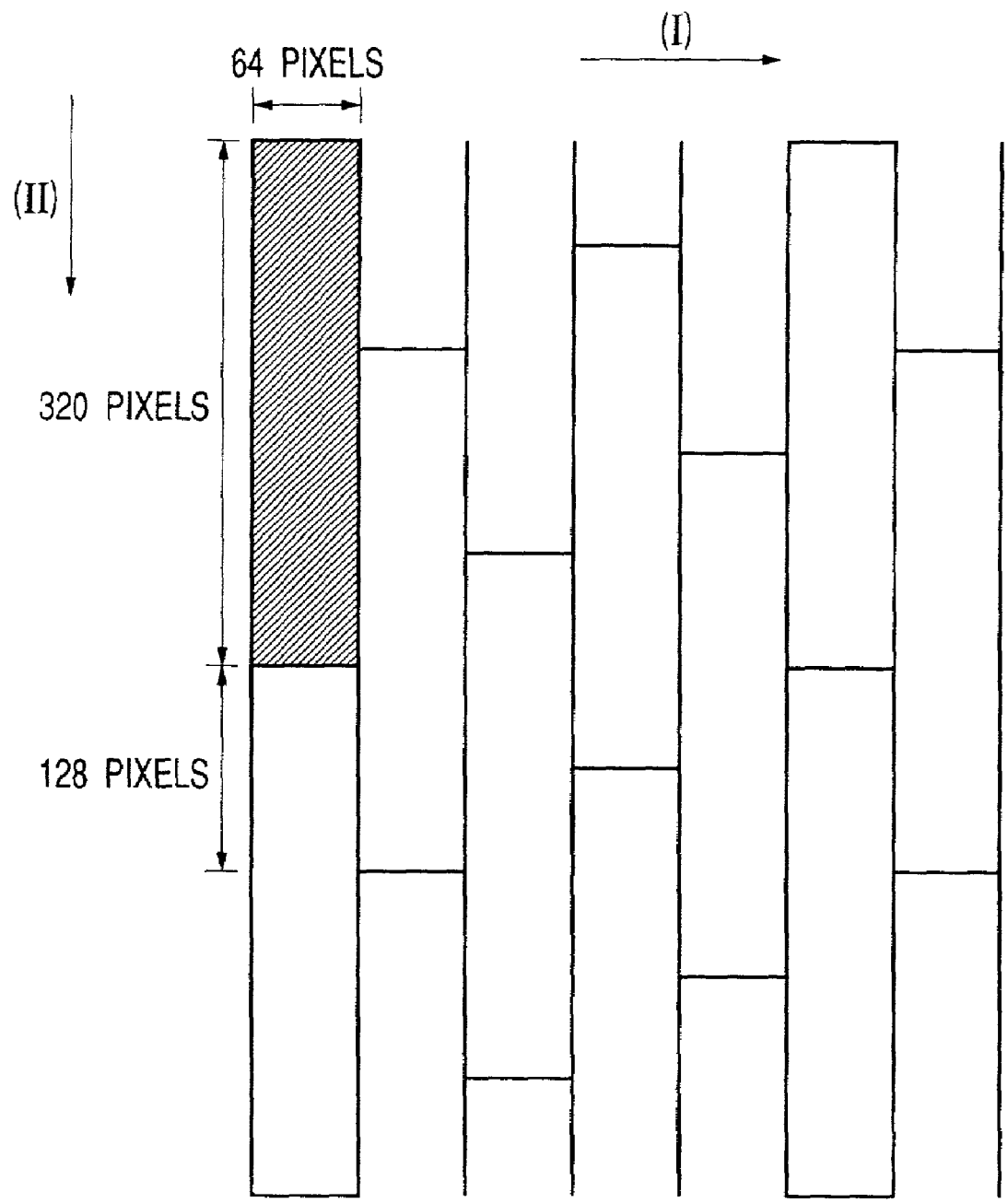
FIG. 17 is a diagram showing a mask shape and a mask arrangement method in the third embodiment.

Such a mask arrangement method is equivalent to the case where the gray rectangular mask of the 64×320 pixels is used while being shifted by the 128 pixels, as shown in FIG. 17. Hereinafter, in consideration of simple calculation, such the mask arrangement method is handled as the above rectangular mask.

Figure 18:
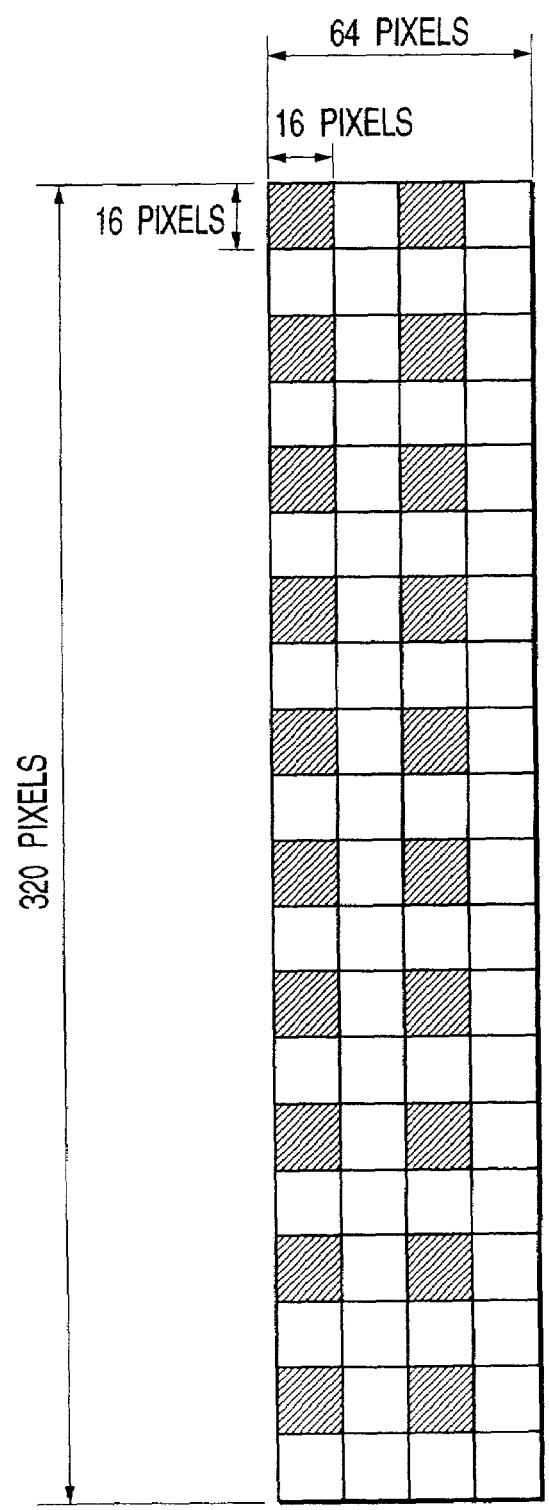
FIG. 18 is a diagram for explaining a basic structure of the mask in the third embodiment.

When the dot pattern of the 64×320 pixels created by using the mask of the present embodiment is divided into the blocks each including the 16×16 pixels as indicated by the solid line in FIG. 18, this dot pattern has the following regularity:

(1) the dot pattern of the first gray level is the pseudo-periodic dot pattern;

(2) the dot patterns in the plural blocks are mutually the same in all the gray levels; and (3) the number of dots in each of all the blocks is equal in all the gray levels.

In the present embodiment, it is assumed that the blocks of the regularity (2) where the dot patterns are mutually the same are the gray-patched 20 blocks of the 16×16 pixels shown in FIG. 18.

Figure 19:
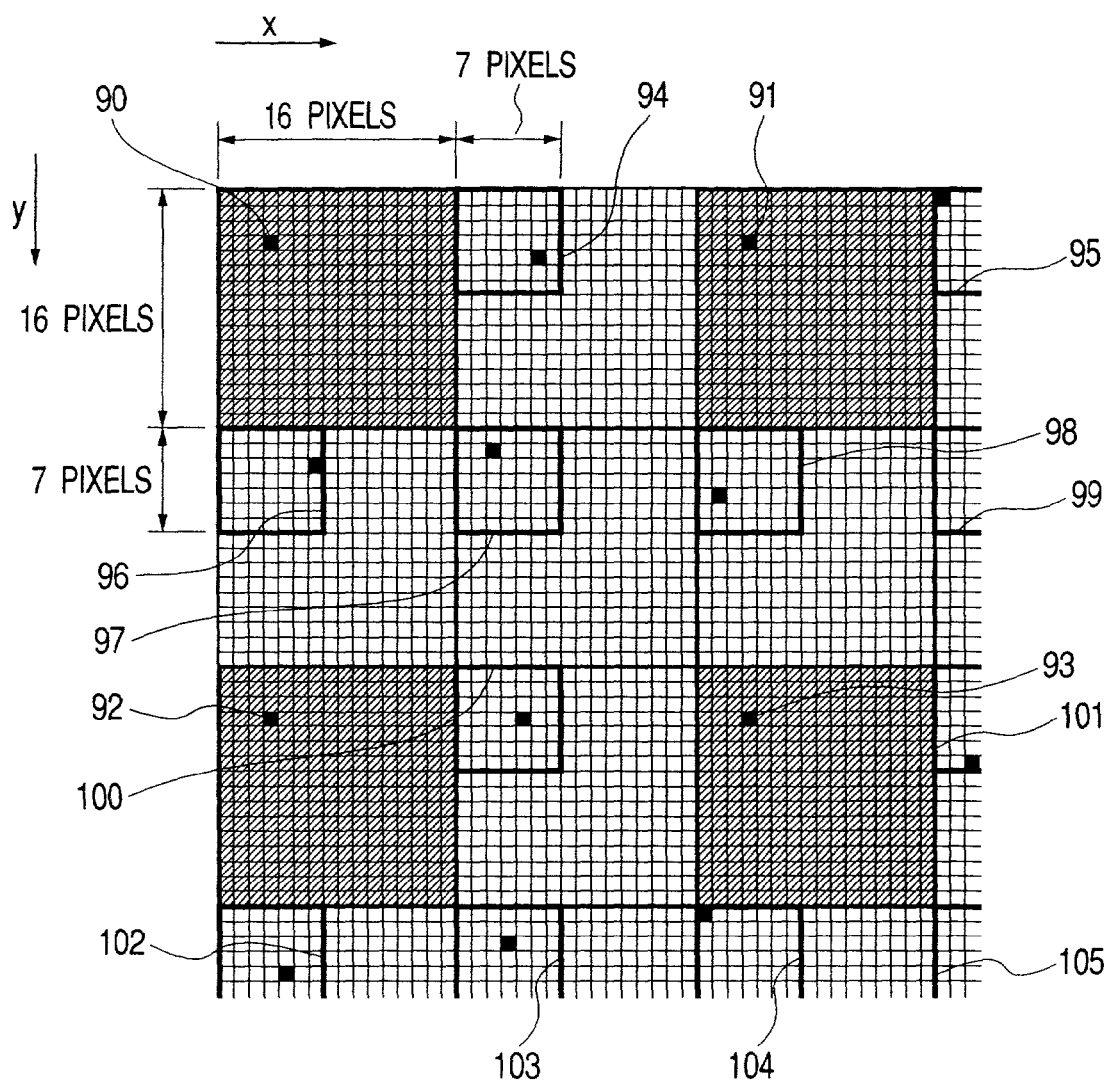
FIG. 19 is a diagram for explaining a method of creating a first gray level dot pattern in the third embodiment.

Next, in the step S2, the dot pattern of the low gray level is determined. In the present embodiment, in the step S2 of FIG. 1, the dot pattern until the first gray level is determined. Hereinafter, the method of creating the dot pattern of the first gray level will be explained with reference to FIG. 19. However, it should be noted that only a part of the dot pattern is illustrated for the convenience of the drawing. In FIG. 19, since the position of lateral x-th pixel and longitudinal y-th pixel from the upper left pixel in the mask is represented by the coordinate (x, y), the upper left pixel is represented by the coordinate (0, 0).

Randomness is not assigned to the dots 90 and 93 which are assigned in the blocks where the dot patterns are mutually the same, and the dot position is given by the coordinates (32m+3, 32n+3) (m=0, 1 and n=0, 1, . . . , 9).

On the other hand, randomness is assigned to the 60 dots which are assigned in the blocks other than the blocks where the dot patterns are mutually the same. In the present embodiment, the dot is selected at random from the blocks of the 7×7 pixels as shown by the thick line (e.g., blocks 94 and 105), with a uniform probability distribution.

The pseudo-periodic dot pattern of the first gray level is completed as above.

Next, the method of creating the dot patterns of the second gray level and the following in the step S3 will be explained.

As described above, the dot patterns of the second gray level and the following are created by using the repulsion potential.

In the present embodiment, a repulsion potential P(g, r) used to perform the process in the step S3 of FIG. 1 is the same as that in the first embodiment.

As described above, this repulsion potential is first assigned to all the already-assigned dots, and at this time, the part overreaching the boundary of the mask is processed by using the periodic boundary condition.

The periodic boundary condition in the present embodiment is similar to that in the second embodiment, whereby the explanation thereof will be omitted. Hereinafter, the periodic boundary condition is used without fail when the repulsion potential is used (step S3-1).

Next, in the blocks where the dot patterns are mutually the same, the averaging operation for the potential sum is performed. By this operation, the potential sum in each of all the 20 blocks where the dot patterns are mutually the same becomes the same.

Next, the pixel that the potential sum is minimum is searched, the dot is assigned to each of the blocks where the dot patterns are mutually the same (i.e., the total 20 dots are assigned), and the potential is assigned to each of the 20 dots, whereby the potential sum is recalculated (step S3-2).

Next, the pixel that the potential sum is minimum is searched within the range not breaking the regularity (3), the dot is assigned to this pixel, and the potential is then assigned around this pixel, whereby the potential sum is recalculated. By repeating the above process, at the time when the assignment of the 60 dots ends, the dot pattern of the second gray level is created (step S3-3).

The third gray level and the following are determined by the same operations as those in the steps S3-1 to S3-3. When the dot patterns until the dot pattern of the maximum gray level are determined and accumulated, the mask is completed (step S4).

Figure 20:
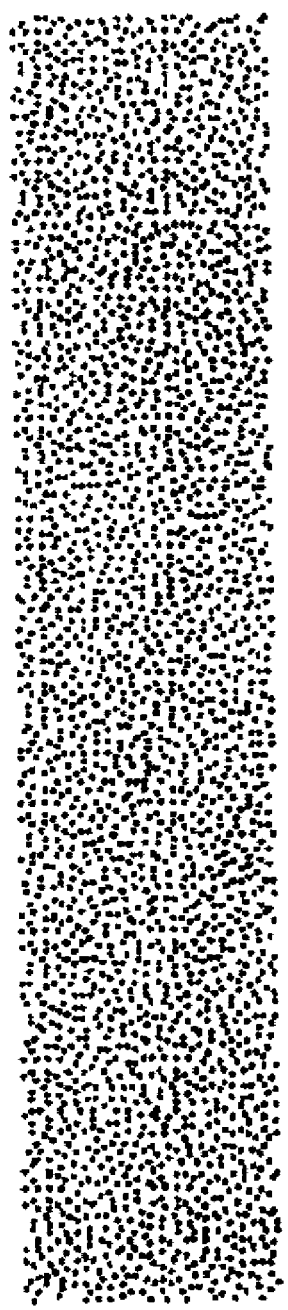
FIG. 20 is a diagram showing a dot pattern of 64×320 pixels of 32 gray levels in the third embodiment.

FIG. 20 shows the dot pattern of the 32nd gray level which is created in the present embodiment. In FIG. 20, it is possible to understand that an extremely uniform and even dot pattern can be obtained.

As in the present embodiment, the shape of the mask in the present invention is not limited to the square. Namely, the mask of which the shape is suitable for the characteristic of the output device can be created.

In the above embodiments, the case where the input image data is converted into the binary data was explained. However, the present invention is not limited to this, but is applicable to a case where the input image data is converted into multivalue (three or more) data.

Next, the case where the input image data is converted into the three-value data.

If it is assumed that the output device is, e.g., an ink-jet printer, when this printer has two kinds of inks (dark and light inks), the value representable by this printer is three values.

When the input data is the data of eight bits per pixel for 256 gray levels, the value of the input data until the 128th gray level is doubled and binarized by using the mask created in the present embodiment. If the obtained result is given as "1", the light ink is output. When the value of the input data from the 129th gray level until the 256th gray level is binarized as it is by using the mask created in the present embodiment. If the obtained result is given as "1", the dark ink is output. Incidentally, as the other method, the mask which is obtained by making each threshold of the mask created in the present embodiment ½ (it should be noted that decimal fraction is rounded down) is separately prepared until the 128th gray level, and this prepared mask may be used for a light-ink mask. By doing so, with respect to the low gray levels (the 128th and following gray levels), the number of dots to be assigned is double as compared with the case where only the dark ink is output. Thus, the part where the input image is gently changed at the low gray levels can be smoothly reproduced.

Therefore, in order to improve reproducibility at the gray level changing part such as a human's skin part or the like, such a technique as producing the multivalue data is important. Thus, when the mask created in the embodiments is applied to this technique, an output image with more excellent image quality can be obtained.

Further, when the present invention is applicable to a color image process, the mask created in the above embodiments only has to be used to perform the binary process or the multivalue process for each color (e.g., Y (yellow), M (magenta), C (cyan), K (black)).

The present invention is applicable to a system which consists of plural devices, e.g., a host computer, an interface, a reader, a printer and the like, or to a single device such as a copying machine, a facsimile machine or the like.

As described above, it is needless to say that the object of the present invention can be achieved in a case where a storage medium recording program codes of software to achieve the functions of the above embodiments is supplied to a system or apparatus, and then a computer (or CPU or MPU) in this system or apparatus reads and executes the stored program codes.

In this case, the program codes themselves read from the storage medium execute the functions of the above embodiments, whereby the storage medium storing these program codes constitutes the present invention.

A threshold matrix created in the above embodiments is also stored in the storage medium. As the storage medium from which the program codes are supplied, e.g., a floppy disk, a hard disk, an optical disk, a magnetooptical disk, a CD-ROM, a CD-R, a magnetic tape, a nonvolatile memory card, a ROM, or the like can be used.

Further, it is needless to say that the present invention includes not only the case where the functions of the above embodiments are executed by the program codes read by the computer, but also a case where an OS (operating system) or the like running on the computer executes a part or all of the actual processes based on instructions of the program codes and thus the functions of the above embodiments are executed by such the processes.

Further, it is needless to say that the present invention includes a case where the program codes read from the storage medium are once stored in a memory provided in a function expansion board inserted in the computer or a function expansion unit connected to the computer, and then a CPU or the like provided in the function expansion board or the function expansion unit performs all or a part of the actual processes based on instructions of the program codes, whereby the functions of the above embodiments are achieved by such the processes.

As many apparently and widely different embodiments of the present invention can be made without departing from the spirit and scope of the present invention, it is to be understood that the present invention is not limited to the specific embodiments thereof expect as defined in the appended claims.

What is claimed is:

1. A gray level reproduction method which makes one-to-one correspondence between each pixel of an original image and each element of a threshold matrix, and represents a density of each pixel in an output image by binary or multivalue, wherein a dot pattern of which the size corresponds to said threshold matrix is divided into interspersed blocks of at least first and second groups of blocks and wherein said threshold matrix is created according to following conditions:

(1) for each gray level of all gray levels, the number of dots in the dot pattern of the output image is equal in each of all the blocks;

(2) for each gray level of all the gray levels, the dot pattern of the output image is mutually the same in each block of the first group of blocks;

(3) for each gray level of all gray levels, the dot pattern of the output image is mutually different for at least some blocks of the second group of blocks; and (4) for increasing gray levels, the number of dots in the dot pattern of the output image is increased while substantially maintaining conformity of the dot patterns at a boundary corresponding to a boundary of the threshold matrix.

2. A method according to claim 1, wherein the dot pattern is determined based on an averaged repulsion potential.

3. A method according to anyone of claim 1 or 2, wherein said threshold matrix is created by controlling an order of dot increase between blocks of the first group and blocks of the second group.

4. A method according to claim 3, wherein the blocks of the first group are preferential as the order of dot increase.

5. A method according to claim 1, wherein a distance between dots in the dot pattern is controlled based on an averaged repulsion potential.

6. A method according to claim 1, wherein when a block is further divided into four smaller blocks, the number of dots in an output image in each of all the smaller blocks is made equal in each of all of 4n gray levels (n is an integer).

7. A method according to claim 1, wherein, when the threshold matrix is repeatedly used two dimensionally and periodically, a repeat direction is diverted to either a longitudinal direction or a lateral direction.

8. A method according to claim 1, wherein a shape of the threshold matrix is different from a square.

9. A method according to claim 1, wherein a color image is decomposed into plural color components, and the original image of at least one color component is input as an input image.

10. A gray level reproduction method which makes one-to-one correspondence between each pixel of an original image and each element of a threshold matrix, and represents a density of each pixel in an output image by binary or multivalue, wherein a dot pattern of which the size corresponds to said threshold matrix is divided into interspersed blocks of at least first and second groups of blocks and wherein said threshold matrix is created according to following conditions:

(1) for each gray level of all gray levels, the number of dots in the dot pattern of the output image is equal in each of all the blocks;

(2) for each gray level of all the gray levels, the dot pattern of the output image is mutually the same in each block of the first group of blocks;

(3) for each gray level of all gray levels, the dot patterns of the output image is mutually different for at least some blocks of the second group of blocks; and (4) for increasing gray levels, an order of dot increase in the dot pattern of the output image is controlled between the blocks of the first group and the blocks of the second group.

11. A method according to claim 10, wherein the blocks of the first group are preferential as the order of dot increase.

12. A method according to claim 10, wherein the dot pattern is determined based on an averaged repulsion potential.

13. A method according to claim 10, wherein when a block is further divided into four smaller blocks, the number of dots in an output image in each of all the smaller blocks is made equal in each of all of 4n gray levels (n is an integer).

14. A method according to claim 10, wherein, when the threshold matrix is repeatedly used two-dimensionally and periodically, a repeat direction is diverted to either a longitudinal direction or a lateral direction.

15. A method according to claim 10, wherein a shape of the threshold matrix is different from a square.

16. A method according to claim 10, wherein a color image is decomposed into plural color components, and the original image of at least one color component is input as an input image.

17. A gray level reproduction apparatus which makes one-to-one correspondence between each pixel of an original image and each element of a threshold matrix, and represents a density of each pixel in an output image by binary or multivalue, wherein, a dot pattern of which the size corresponds to said threshold matrix is divided into interspersed blocks of at least first and second groups of blocks and wherein said threshold matrix is created according to the following conditions: (1) for each gray level of all gray levels, the number of dots in the dot pattern of the output image is equal in each of all the blocks, (2) for each gray level of all gray levels, the dot pattern of the output image is mutually the same in each block of the first group of blocks, (3) for each gray level of all the gray levels, the dot pattern of the output image is mutually different for at least some blocks of the second group of blocks, and (4) for increasing gray levels, the number of dots in the dot pattern of the output image is increased while substantially maintaining conformity of the dot patterns at a boundary corresponding to a boundary of the threshold matrix, said apparatus comprising:

storage means for storing said threshold matrix;

comparison means for comparing as a threshold the value of said threshold matrix with the density of each pixel of the original image for each pixel; and output means for outputting the binary- or multivalue-processed dot pattern according to the comparison result of said comparison means.

18. An apparatus according to claim 17, wherein said threshold matrix is created by controlling order of dot increase between the blocks of the first group and the blocks of the second group.

19. A gray level reproduction apparatus which makes one-to-one correspondence between each pixel of an original image and each element of a threshold matrix, and represents a density of each pixel in an output image by binary or multivalue, wherein, a dot pattern of which the size corresponds to said threshold matrix is divided into interspersed blocks of at least first and second groups of blocks and wherein said threshold matrix is created according to the following conditions: (1) for each gray level of all gray levels, the number of dots in the dot pattern of the output image is equal in each of all the blocks, (2) for each gray level of all the gray levels, the dot pattern of the output image is mutually the same in each block of the first group of blocks, (3) for each gray level of all gray levels, the dot pattern of the output image is mutually different for at least some blocks of the second group of blocks, and (4) for increasing gray levels, an order of dot increase in the dot pattern of the output image is controlled between the blocks of the first group and the blocks of the second group, said apparatus comprising:

storage means for storing said threshold matrix;

comparison means for comparing as a threshold the value of said threshold matrix with the density of each pixel of the original image for each pixel; and output means for outputting the binary- or multivalue-processed dot pattern according to the comparison result of said comparison means.

20. A threshold matrix which is used to be compared with each pixel of an original image to represent a density of each pixel in an output image by binary or multivalue, wherein a dot pattern of which the size corresponds to said threshold matrix is divided into interspersed blocks of at least first and second groups of blocks, and wherein said threshold matrix is created according to the following conditions:

(1) for each gray level of all gray levels the number of dots in the dot pattern of the output image is equal in each of all the blocks;

(2) for each gray level of all the gray levels, the dot pattern of the output image is mutually the same in each block of the first group of blocks;

(3) for each gray level of all gray levels, the dot pattern of the output image is mutually different for at least some blocks of the second group of blocks; and (4) for increasing gray levels, the number of dots in the dot pattern of the output image is increased while substantially maintaining conformity of the dot patterns at a boundary corresponding to a boundary of the threshold matrix.

21. A threshold matrix according to claim 20, wherein said threshold matrix is created by controlling order of dot increase between the blocks of the first group and the blocks of the second group.

22. A threshold matrix which is used to be compared with each pixel of an original image to represent a density of each pixel in an output image by binary or multivalue, wherein a dot pattern of which the size corresponds to said threshold matrix is divided into interspersed blocks of at least first and second groups of blocks, and wherein said threshold matrix is created according to the following conditions:

(1) for each gray level of all gray levels, the number of dots in the dot pattern of the output image is equal in each of all the blocks;

(2) for each gray level of all the gray levels, the dot pattern of the output image is mutually the same in each block of the first group of blocks;

(3) for each gray level of all gray levels, the dot pattern of the output image is mutually different for at least some blocks of the second group of blocks; and (4) for increasing gray levels, an order of dot increase in the dot pattern of the output image is controlled between the blocks of the first group and the blocks of the second group.

23. A computer-readable storage medium which stores a computer-executable control program to control a gray level reproduction process which makes one-to-one correspondence between each pixel of an original image and each element of a threshold matrix and represents a density of each pixel in an output image by binary or multivalue, wherein, a dot pattern of which the size corresponds to said threshold matrix is divided into interspersed blocks of at least first and second groups of blocks and wherein said threshold matrix is created according to the following conditions: (1) for each gray level of all gray levels, the number of dots in the dot pattern of the output image is equal in each of all the blocks, (2) for each gray level of all gray levels, the dot pattern of the output image mutually the same in each block of the first group of blocks, (3) for each gray level of all the gray levels, the dot pattern of the output image is mutually different for at least some blocks of the second group of blocks, and (4) for increasing gray levels, the number of dots in the dot pattern of the output image is increased while substantially maintaining conformity of the dot patterns at a boundary corresponding to a boundary of the threshold matrix, said control program comprising:

a comparison step for comparing a threshold value of the threshold matrix with the density of each pixel of the original image for each pixel; and an output step for outputting the binary- or multivalue-processed dot pattern according to the comparison result of said comparison step.

24. A computer-readable storage medium according to claim 23, wherein said threshold matrix is created by controlling order of dot increase between the blocks of the first group and the blocks of the second group.

25. A computer-readable storage medium which stores a computer-executable control program to control a gray level reproduction process which makes one-to-one correspondence between each pixel of an original image and each element of a threshold matrix and represents a density of each pixel in an output image by binary or multivalue, wherein, a dot pattern of which the size corresponds to said threshold matrix is divided into interspersed blocks of at least first and second groups of blocks and wherein said threshold matrix is created according to the following conditions: (1) for each gray level of all gray levels, the number of dots in the dot pattern of the output image is equal in each of all the blocks, (2) for each gray level of all gray levels, the dot pattern of the output image is mutually the same in each block of the first group of blocks, (3) for each gray level of all the gray levels, the dot pattern of the output image is mutually different for at least some blocks of the second group of blocks, and (4) for increasing gray levels, and order of dot increase in the dot pattern of the output image is controlled between the blocks of the first group and the blocks of the second group, said control program comprising:

a comparison step for comparing the threshold value of the threshold matrix with the density of each pixel of the original image for each pixel; and an output step for outputting the binary- or multivalue-processed dot pattern according to the comparison result of said comparison step.

\* \* \* \* \*

UNITED STATES PATENT AND TRADEMARK OFFICE
CERTIFICATE OF CORRECTION

PATENT NO. : 6,985,259 B2
APPLICATION NO. : 09/826934
DATED : January 10, 2006
INVENTOR(S) : Okinaka et al.

It is certified that error appears in the above-identified patent and that said Letters Patent is hereby corrected as shown below:

COLUMN 2:
Line 38, "Half-toning" should read -- Halftoning --.

COLUMN 4:
Line 53, "means, wherein" should have a paragraph break before "wherein"; and
Lines 55-56, delete the line break between "blocks" and "where".

COLUMN 5:
Line 13, "levels-," should read -- levels; --.

COLUMN 6:
Line 56, "image" should read -- image with --.

COLUMN 7:
Line 12, "version" should read -- versions --.

COLUMN 9:
Line 42, "dot" should read -- dots --; and
Line 44, "dot" should read -- dots --.

COLUMN 18:
Line 6, "fol-" should read -- the fol- --;
Line 25, "anyone of claim 1 or 2," should read -- any one of claims 1 or 2, --;
Line 39, "two dimensionally" should read -- two-dimensionally --;
Line 56, "fol-" should read -- the fol --; and
Line 65, "patterns" should read -- pattern --.

UNITED STATES PATENT AND TRADEMARK OFFICE
CERTIFICATE OF CORRECTION

PATENT NO. : 6,985,259 B2
APPLICATION NO. : 09/826934
DATED : January 10, 2006
INVENTOR(S) : Okinaka et al.

It is certified that error appears in the above-identified patent and that said Letters Patent is hereby corrected as shown below:

COLUMN 21:
Line 7, "image" should read -- image is --.

COLUMN 22:
Line 15, "and order" should read -- an order --.

Signed and Sealed this

Tenth Day of October, 2006

JON W. DUDAS
*Director of the United States Patent and Trademark Office*